United States Patent [19]

Beall et al.

[11] Patent Number: 4,490,848

[45] Date of Patent: Dec. 25, 1984

[54] METHOD AND APPARATUS FOR SORTING CORNER POINTS IN A VISUAL IMAGE PROCESSING SYSTEM

[75] Inventors: Donald L. Beall, North Syracuse; Harold W. Tomlinson, Jr., Liverpool, both of N.Y.

[73] Assignee: General Electric Company, Orlando, Fla.

[21] Appl. No.: 363,665

[22] Filed: Mar. 31, 1982

[51] Int. Cl.³ .............................. G06K 9/48
[52] U.S. Cl. ..................... 382/121; 382/8; 382/25
[58] Field of Search ............ 382/5, 21, 23, 25, 8

[56] References Cited

U.S. PATENT DOCUMENTS

| | | | |
|---|---|---|---|
| 3,576,980 | 5/1971 | Doyle | 235/152 |
| 3,638,188 | 1/1972 | Pincoffs et al. | 382/23 |
| 3,863,218 | 1/1975 | Oka et al. | 340/146.3 |
| 3,889,234 | 6/1975 | Makihara et al. | 340/146.3 |
| 3,905,018 | 9/1975 | Gray | 340/146.3 |
| 3,936,800 | 2/1976 | Ejiri et al. | 340/146.3 |
| 3,987,412 | 10/1976 | Morrin, II | 340/146.3 |
| 4,087,788 | 5/1978 | Johannesson | 340/146.3 |
| 4,093,941 | 6/1978 | Bryan et al. | 340/146.3 |
| 4,118,730 | 10/1978 | Lemelson | 358/93 |
| 4,162,482 | 7/1979 | Su | 340/146.3 |
| 4,183,013 | 1/1980 | Agrawala et al. | 340/146.3 |
| 4,272,756 | 6/1981 | Kakumoto et al. | 382/23 |
| 4,288,779 | 9/1981 | Otsu et al. | 340/146.3 |
| 4,288,782 | 9/1981 | Bader et al. | 340/146.3 |
| 4,300,122 | 11/1981 | McMahon | 340/146.3 |
| 4,310,827 | 1/1982 | Asai | 382/21 |
| 4,361,830 | 11/1982 | Honma et al. | 382/25 |

OTHER PUBLICATIONS

Batchelor et al., "Fast Generation of Chain Code", *IEE Proc.*, vol. 127, Pt. E, No. 4, Jul. 1980.
Zahn, C. T., "A Formal Description for Two Dimensional Patterns", *Proceedings of the International Joint Conference on Artificial Intelligence*, May 1969, pp. 621-628.
Reinhold et al., "The Autovision System", *Robotics Age*, Fall 1980, pp. 22-28.
Kinnucan, P., "How Smart Robots are Becoming Smarter", *High Technology*, Sep./Oct. 1981, pp. 32-40.

*Primary Examiner*—Leo H. Boudreau
*Attorney, Agent, or Firm*—James H. Beusse

[57] ABSTRACT

Method and apparatus is disclosed for automatically processing visual images electronically so as to permit intelligent machine analysis of the image content. A special distributed logic system architecture facilitates rapid real time image analysis and the production of reaction control signals in a high speed production line environment, for example. Dedicated decision logic is employed to determine in but a single microinstruction cycle whether a detected corner point of the image should be linked to another already linked chain of such corner points so as to define part of a closed edge contour of the image under examination. This ability to so rapidly classify encoded corner points as either belonging or not belonging to a given set of such corner points which describe a closed edge contour is quite useful in achieving rapid real time image analysis capability. Special dedicated data address indexing circuitry is also employed for most expeditiously retrieving successive address linked data words from a data memory in successive single micro-instruction cycles as required to take full advantage of the high speed dedicated corner point matching circuitry. The dedicated data memory indexing circuitry is provided in addition to the usual program instruction indexing circuitry employed in connection with the instruction register of the associated data processing system.

20 Claims, 29 Drawing Figures

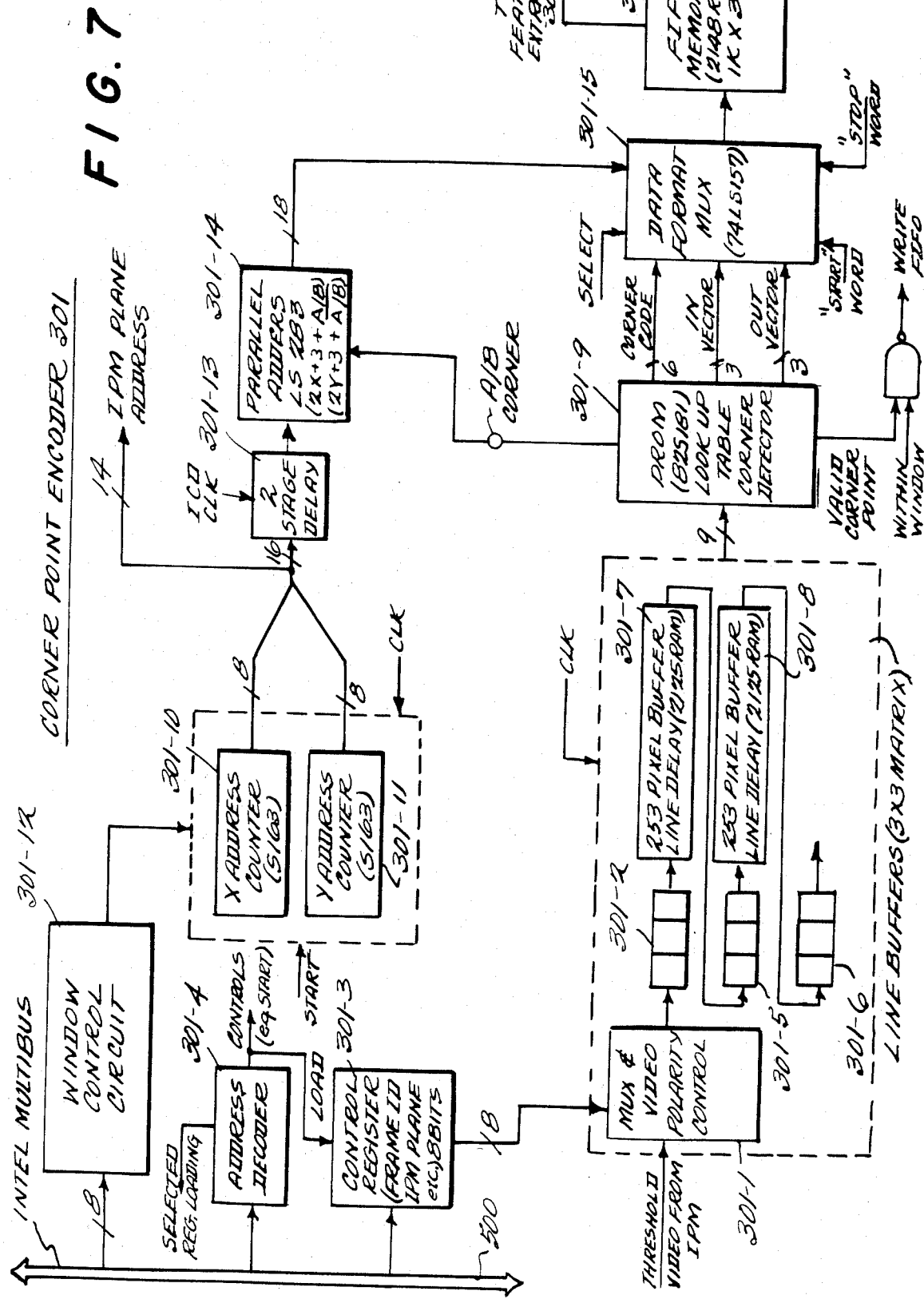

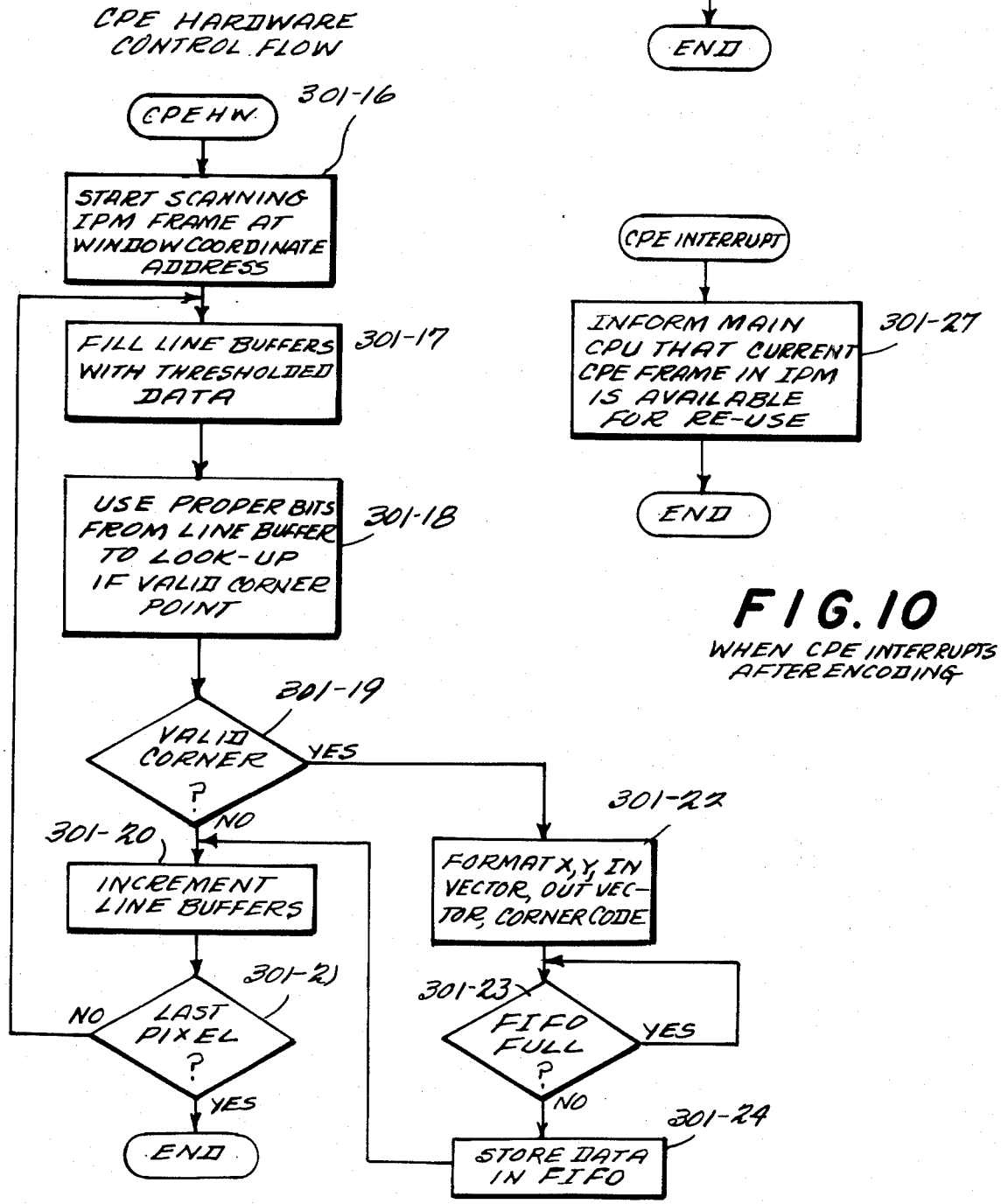

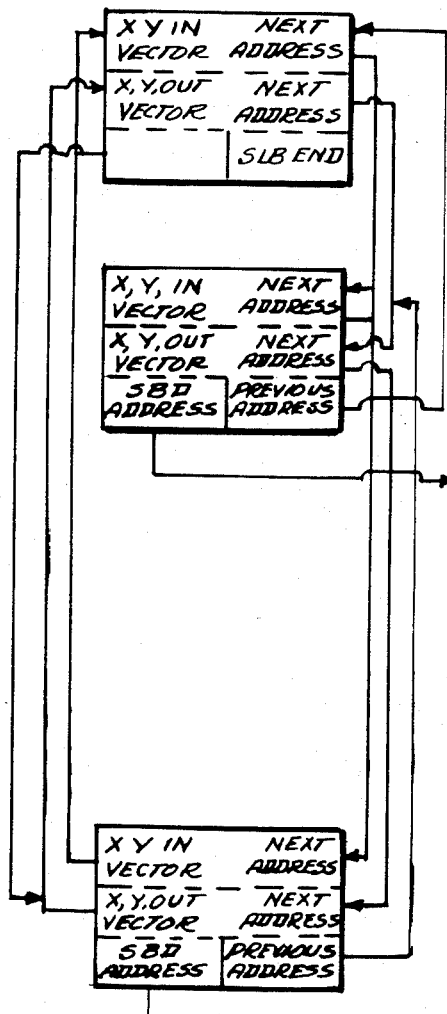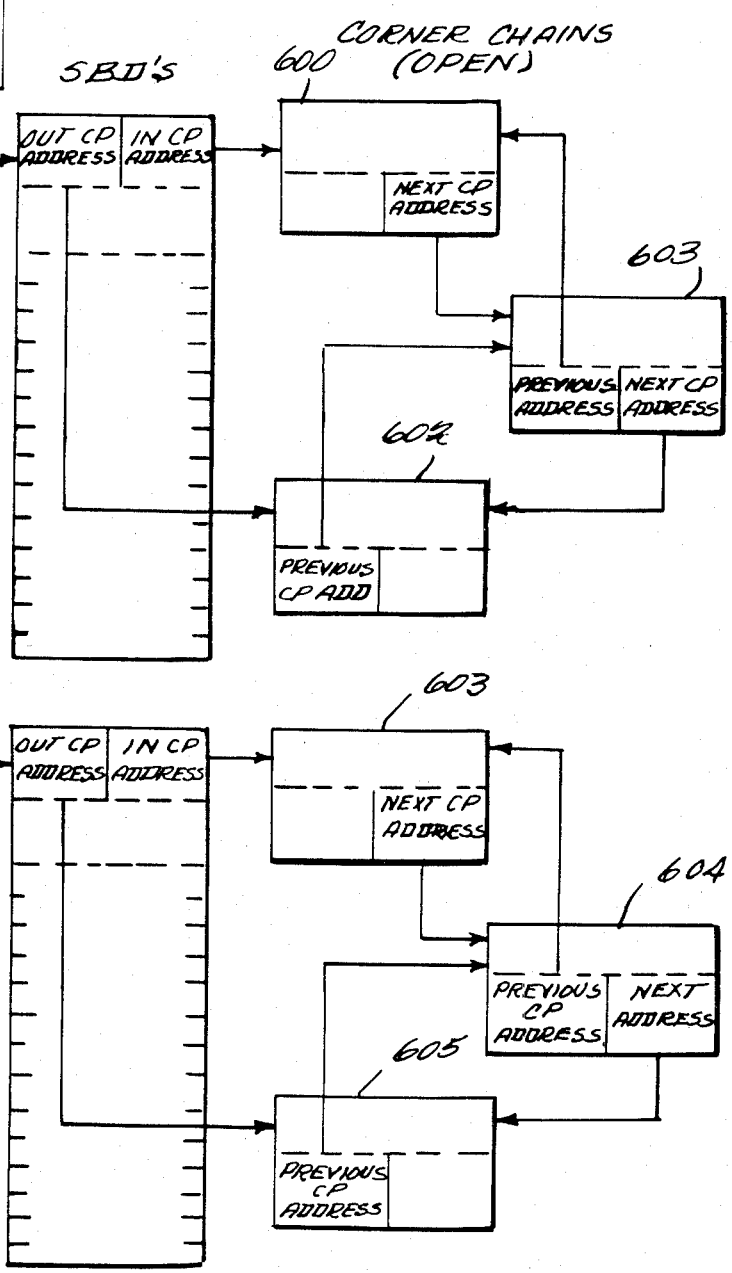
FIG. 12

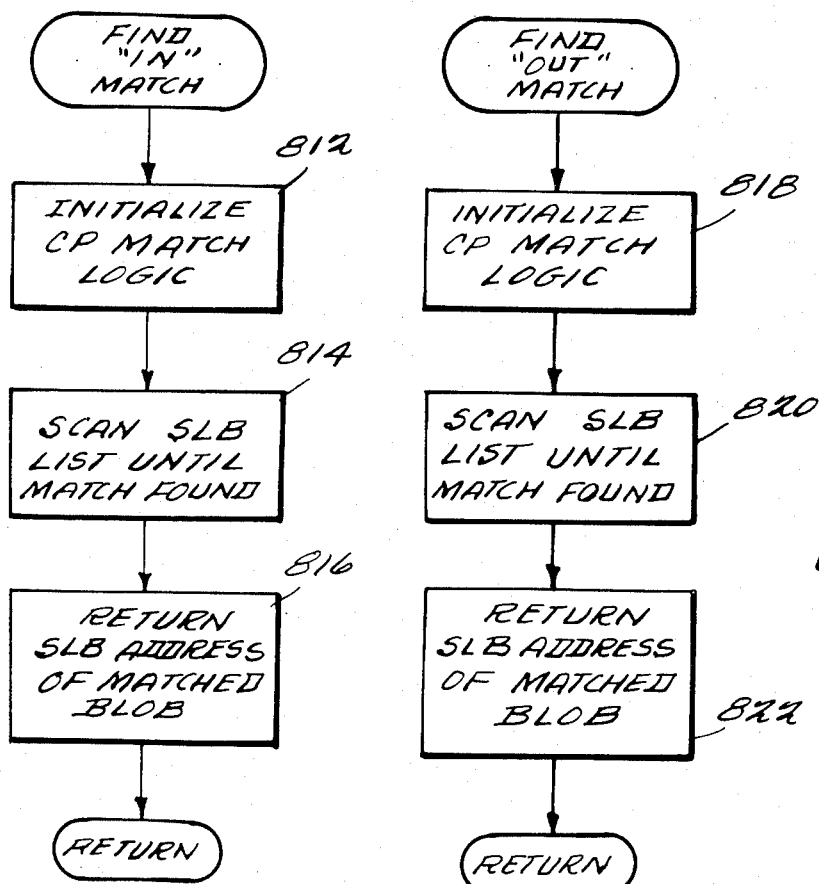
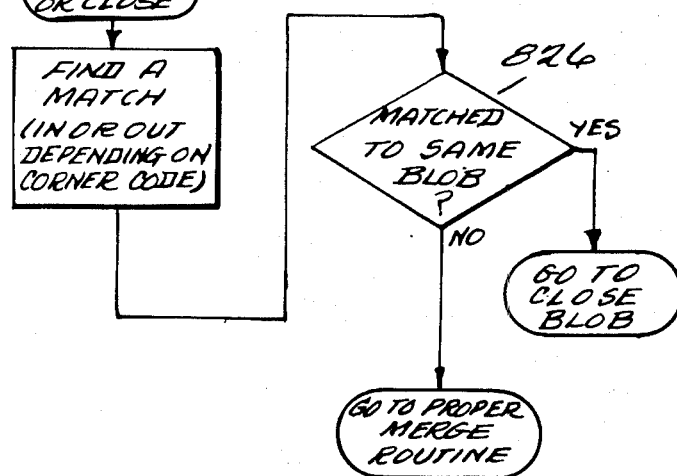
FIG.16-4
FIG.16-5

METHOD AND APPARATUS FOR SORTING CORNER POINTS IN A VISUAL IMAGE PROCESSING SYSTEM

This application is generally directed to method and apparatus for automatic electronic processing of visual images. More specifically, it is directed to a dedicated decision logic used in sorting corner points in a visual image processing system which digitally processes an electronic video image of an object within a predefined field of view so as to automatically identify closed edge contours of the object(s) within such an image. Typically, predetermined geometric features of such identified closed edge contours are automatically quantified and thus made available to user-generated decision logic programs designed to detect the presence or absence of predetermined desirable and/or undesirable object features. For example, the invention may be used in the environment of a high speed manufacturing line to automatically reject out-of-tolerance or otherwise unacceptable parts travelling on a conveyor belt or the like.

This application is related to the commonly assigned copending application Ser. No. 363,664 of Messrs. Hart et al and our own application Ser. No. 363,970, both filed concurrently herewith.

The invention is useful in a form of automated electronic vision which may be employed in a wide variety of manufacturing or other applications (e.g. to provide a form of robot vision or in optical character recognition or in image facsimile transmission systems, etc.). It may, for example, be employed effectively in the manufacturing processes of fabrication, assembly, packaging, inspection, monitoring, control and others. It is ideally suited to repetitive, monotonous, exacting industrial tasks, even in environments of heat, dirt or noise which would be unpleasant or intolerable for human operators. It is also not subject to the usual fatigue, boredom, performance degradation or error which typically affect human operators.

Electronic visual image processing systems of various types have been proposed and/or successfully demonstrated and used in the prior art. For example, the General Electric Company has earlier marketed a model PN 2303 OPTOMATION ™ instrument system. This prior system utilizes a charge injection device (CID) solid state camera to convert an optical image within the camera's field of view into a digitized electronic video input signal. The digitized video is "thresholded" to produce a binary-valued digital image which is then digitally analyzed by a single micro-processor based system (including some dedicated decision hardware) to count the number of "white" or "black" pixels along given horizontal or vertical lines so as to measure predetermined geometrical features of the image such as length, height, area, relative or absolute location, etc. Simple shape recognition and "self-teaching" capability are also provided by comparing the presently viewed object with a set of similar features calculated from a previous reference image. Electronic defined "windows" within the overall camera field of view permit multiple measurements to be made concurrently on different objects or portions of an object within a given field of view. This earlier model PN 2303 equipment was also user-programmable by means of control switches which were provided so as to select various performance options and to establish desired measurement values, etc. It is typically used in conjunction with a General Electric model PN 2120 strobe illumination system so as to "stop" the motion of a part on a moving conveyor belt as each frame of video data is captured.

While the earlier PN 2303 system has provided a powerful tool for a wide variety of applications including high speed on-line inspection, part sorting or selection, in-process monitoring and control, real-time precision measurements, etc., it has been somewhat limited in the type of applications and measurements that may be performed. It also does not provide for higher level image analysis functions.

Other image processing techniques have been proposed which would perform binary picture analysis using corner point detection and the sorting of corner point data into linked sets describing closed edge contours. Such techniques are described in a paper authored by Mr. C. T. Zahn entitled "A Formal Description For Two Dimensional Patterns", published in the Proceedings of the International Joint Conference on Artificial Intelligence, May 1969, pages 621-628. The corner point encoder of Zahn employs two encoding masks or windows, one $2 \times 3$ and the other $3 \times 2$ pixels, which scan the picture in alternating passes requiring data storage in a frame buffer. Other systems employing $3 \times 3$ pixel mask logic have also been proposed, as for example in U.S. Pat. Nos. 3,889,234—Makihara et al and 4,087,788—Johannesson.

Another visual image processing system is presently marketed by Automatix of Burlington, Mass., under the name "Autovision II programmable visual inspection system" as described by Messrs. Reinhold and Vanderbrug in the Fall 1980 issue of Robotics Age in an article entitled "The Autovision System" at pages 22-28.

Still other electronic visual image processing systems are described in U.S. Pat. No. 4,118,730—Lemelson (1978) and in "How Smart Robots are Becoming Smarter" by Paul Kinnucan, published in High Technology, September/October 1981, pages 32-40.

The overall functional architecture of the present exemplary embodiment of an entire visual image processing system is our joint invention with Messrs. Hart et al and is claimed in U.S. patent application Ser. No. 363,664 filed concurrently herewith. This architecture provides a unique and highly advantageous allocation of image processing functions to dedicated logic decision hardware where high speed performance is required, to dedicated firmware-implemented decision logic where relatively greater amounts of time are available for processing relatively smaller amounts of data in a real time environment, and finally, to software-implemented decision logic where user-generated flexibility of operation is the prime consideration and where relatively greater periods of time are available for processing the data that has been so greatly reduced by the earlier dedicated hardware and firmware-implemented decision logic.

In this unique system architecture, initial video data processing functions are performed under the direct control of a first microprocessor while subsequent more complex image data processing functions are controlled by a second independent microprocessor. Both the video processing and image processing subsystems are capable of substantial asynchronous independent operations once set up and initiated by an overall system control implemented with yet a third microprocessor (main CPU) which is in communication with the other two microprocessors via a common bus conductor system (which conveys parallel digital address, data and control signals between the three different microprocessor systems). In addition to coordinating the data processing activities of the video processing and image processing subsystems, the third microprocessor-based system (or "main CPU") may include user-generated software for analyzing, comparing or otherwise making desired decisions as to acceptance/rejection, tolerance, measurement, etc. of object(s) in the image under inspection based, at least in part, upon predetermined geometric features that have been previously identified and quantized by the video processing and image processing subsystems.

Stated somewhat differently, the architectural approach embedded in the present invention represents an optimized partitioning of hardware versus software and dedicated versus programmable implementation of data processing functions for this type of visual image processing. Dedicated hardware modules are utilized for the high data content, high data rate preprocessing and image processing functions which are relatively application invariant. These modules are controlled by respectively corresponding micrprocessors which also help perform initial selective data reduction and compression at high speed in the data path. In this manner, flexibility is maintained without sacrificing speed. Hardware/firmware modules are also utilized in the data path so as to efficiently perform the necessary corner encoding, feature extraction (i.e. sorting of encoded corner points into linked lists defining closed edge contours), "macro-image" reconstruction and manipulation, etc. again, controlled by the respective independent microprocessors provided in the video processing and image processing subsystems. In this manner, high speed is maintained so as to permit high speed real-time image analysis by successively compressing the amount of data which must be retained to sufficiently describe the image under examination. Once the dedicated hardware/firmware video processing and image processing subsystems have reduced the data to a level which is manageable by the main CPU, it is user-programmed to perform any desired feature analysis, comparison with reference data and/or other subsequent logical operations that may be desired so as to generate appropriate output decisions and/or data. That is, the inherent flexibility of software processing is taken advantage of primarily only in the post-processing system microprocessor where it is most needed without limiting the overall machine processing speed.

Special asynchronous buffer data storage is employed between dedicated decision logic modules capable of simultaneous operation. Interrelated control of such modules and buffer storage is coordinated by the main CPU so as to keep all the dedicated logic modules simultaneously working at maximum capability. Special data multiplexing and switching paths also provide for improved data processing flexibility.

Within the overall novel system architecture just described is especially unique and novel dedicated decision logic (mostly hardware in the exemplary embodiment) for determining whether a given corner point is "matched" to a free end of a previously linked chain of such encoded corner points. If so, then the corner point under examination is itself linked to the matched chain so as to become one free end of the chain. Or, if matched to both free ends of an existing linked chain, it is linked to both such ends so as to complete the chain. If matched to a free end of two different already linked chains, then it is linked to both such chains which are thereafter "merged" to form a single chain having the usual two free ends until it is completed. If not matched to any end of any existing already linked chain of such encoded corner points, then the corner point under examination itself constitutes the beginning of a new linked chain.

So far as is known, in the past, when such corner point matching has been attempted it has been software implemented in a fashion which requires many instruction execution cycle times to determine whether a corner point is "matched" to a previously existing linked set of corner points. In a practical environment, there may literally be thousands of corner points in a given image and, accordingly, if high part throughput is to be handled in real time so as to permit parts to automatically be ejected from a moving conveyor belt or the like (e.g. 900 parts per minute on each of four parallel lines under inspection by the same system), then a much faster decision must be made as to whether a corner point is "matched" or not to a free end of a preexisting linked chain of corner points.

The dedicated corner point decision logic hardware utilized within the exemplary embodiment is our invention. As described herein, this dedicated decision logic circuitry is capable of determining whether a corner point is "matched" to the free end of an existing linked chain of such corner points in only a single microinstruction execution cycle time of the controlling microprocessor of the image processing subsystem. Because a complete match or no match decision can thus be implemented within a single instruction cycle time, it is possible to make hundreds and thousands of such decisions in analyzing a given image within the very short time that may be available between successive images that are to be analyzed in a real time environment.

In brief, the dedicated corner point sorter is concerned with binary (thresholded) picture analysis and the rapid generation of boundaries around items in the picture. The boundaries are formed by connecting the corner points found on the item's edges. The exemplary embodiment of the invention includes a digital hardware device that rapidly determines how certain corner points are to be connected to form the item boundaries.

The picture analysis in the exemplary overall system starts with another hardware device which scans the binary picture for the corner points. Each point is marked by its coordinate and the direction of the boundary change "in" and "out" of the corner. One problem is to correctly sort the corner points into their respective items and then link them to form a continuous corner point chain, i.e., a boundary. If the sorting is done in software by a computer, the boundary generation time can be long compared to video frame rates (33 ms). To perform the picture analysis at real time video rates, a fast corner point sorter is required.

This invention sorts corner points rapidly, while using a small amount of memory storage. The corner point sorter hardware is used in the exemplary embodiment with a 32 bit-slice microprocessor and a digital memory. The picture analysis starts with a corner point encoder, which finds the picture's corner points and generates coordinate, direction and processing information for each one. This information is read by the bit-slice processor which uniquely connects the corner points and stores the item boundaries as doubly linked lists in the memory. For most corner points, the corner point sorter hardware is used to determine to which boundary the corner point belongs.

The type of processing to be performed on a corner point is typically passed to the processor by a 6 bit code. Each corner point is processed in a specific way, depending on its "in" and "out" vectors. In general, a corner point will:

1. Start a new boundary.
2/3. Connect immediately to the in/out side of the last corner point processed.
4/5. Connect to the in/our end of a boundary.
6. Merge two boundaries or close a boundary.

In case 4/5, only the in or out free ends of the corner point chains are checked for a match, as determined by the corner code. If a corner point merges two chains, then a check must be made on both the in and out free ends of the corner point chains.

The eight possible vector directions are represented by a 3 bit code. The "in" and "out" vector information as well as the coordinate of the corner point enables the proper sorting of the corner points.

To determine to which corner point chain a corner point belongs, the vector and coordinate information of the end corner points of all unclosed corner point chains must be stored in memory. Each unclosed chain has two ends to it, an end with a free "in" vector, and an end with a free "out" vector. The end point data from each such chain is stored in a linked list called Sort Link Block (SLB) chain to speed up the sorting process. The coordinate and vector data from each end corner point is stored in the same word in memory along with the index to the next datum in the list. When a corner is received which must be sorted to the correct corner point chain, the processor searches the SLB chain until a match is found between the corner point and a corner point chain end. The match is signalled by the corner point sorter hardware when any of 3 conditions are satisfied:

Case 1

Corner point in(out) vector = corner point chain out(in vector and $X_{corner\ point} - X_{end\ point} = 0$ and in(out) vector = 010 or 110.

Case 2

Corner point in(out) vector = corner point chain out(in) vector and $X_{corner\ point} - X_{end\ point} = Y_{corner\ point} - Y_{end\ point}$ and in(out) vector = 001 or 101.

Case 3

Corner point in(out) vector = corner point chain out(in) vector and $X_{corner\ point} - X_{end\ point} = -(Y_{corner\ point} - Y_{end\ point})$ and in(out) vector = 011 or 111.

Before the sorting process starts, the processor stores the corner point vector data in the sorter hardware and selects whether the corner point "in" or "out" vector is to be compared by the corner point sorting hardware. This is determined by the corner point processing code. Then the carry flow between two slices of the microprocessor is interrupted to form two 16 bit slice microprocessors. Next the processor searches the SLB chain by reading the end point coordinate data from the memory and subtracting it from the corner point coordinate data to generate $\Delta x$ and $\Delta y$ coordinate difference data. Because the carry flow between two slices has been interrupted, the $\Delta X$ data will appear in the upper 16 bits of the microprocessor output, and the $\Delta Y$ data will appear in the lower 16 bits. The $\Delta X$ and $\Delta Y$ data along with the end point "in" and "out" vector information are sent to the sorter hardware, which substantially immediately signals the processor if a match was found. Preferably, also taking place in the same micro-instruction is the indexing of the memory address to the next boundary in the list. If this is done, a new boundary compared to every micro-instruction, and the sorting process is very fast.

The amount of hardware necessary to determine the corner point match has been considerably reduced by a unique combination of firmware and hardware. With the addition of a single "OR" gate to the mainline processor to interrupt the carry flow between the 2nd and 3rd 4-bit slices, the processor may be microprogrammably controlled to perform arithmetic in a first mode as two simultaneous 16 bit calculators or in a second mode as a single 32 bit calculator. The connectivity process utilizes the first mode to generate the $\Delta X$ and $\Delta Y$ data in firmware (prior to being passed to the hardware) while the analysis tasks utilize the 2nd mode.

The feature extractor in the exemplary embodiment of an overall visual image processor uses this invention to speed up picture analysis by a factor of up to 10 over previously used software techniques.

As previously mentioned, with such greatly enhanced corner point matching ability at hand, it thus becomes desirable to rapidly access the free end corner points of previously linked chains of corner points so that such free ends may be successively tested for match with a new corner point. Since the matching decision can be made in a single micro-instruction cycle time of the controlling microprocessor, the free end corner points of previously linked chains should be retrievable from memory in successive instruction cycle times.

That is, if there are, for example, 100 free end corner points of 50 previously linked but unclosed chains of corner points, to take full operational advantage of the enhanced corner point matching capability earlier described (one decision each instruction cycle time), it is necessary to present 50 of the 100 successive free end corner points, representing either the "in" to "out" free ends, to the corner point matching circuitry in successive instruction cycles until a match is found. Accordingly, in 50 instruction cycle times or less, it can be determined whether the free corner point under examination matches any of the previously linked free end corner points and, if so, exactly which ones are so matched. Thereafter, appropriate action can be taken to link the new corner point with the proper corner point chain.

To permit this rapid sequential retrieval of free end corner points from memory, a unique dedicated hardware data memory address indexing circuit is employed. This circuit is also the invention of Messrs. Donald L. Beall and Harold W. Tomlinson and is claimed in copending commonly assigned U.S. patent application Ser. No. 363,970 filed concurrently herewith. It provides the ability to immediately transfer predetermined bits from a word read out of the data memory directly to the data memory address register so that, on the very next instruction cycle, the next successive free end corner point may be retrieved for comparison in the corner point match logic (even though it is not stored in the next successive memory location). Such free end corner points are preferably stored in an address-linked fashion such that part of the free end corner point data read from memory identifies the next (and or the previous) free end corner point address. As may be recognized from the above description, the data memory contents involve doubly-linked lists. At a first level, the individual lists of previously linked corner points are address linked one to another to form corner chains and, in addition, the free end corner points of these linked chains or lists are themselves address linked to other free end corner points of similar chains already identified in the sorting process to form SLB chains. The special data memory address indexing hardware just described is provided in addition to the typical and usually provided instruction memory address indexing hardware associated with the instruction register of a data processor. In addition, in the preferred embodiment, a multiplexer is employed in the feedback circuitry from the data memory output to the data memory address register so that different permutations and/or combinations of subsets of the output data words may be fed back to the address register and/or so that other more traditional sources of address data may be used to fill the address register.

These as well as other objects and advantages of this invention will be more completely understood and appreciated by studying the following detailed description of the presently preferred exemplary embodiment of this invention taken in conjunction with the accompanying drawings, of which:

Figure 1:
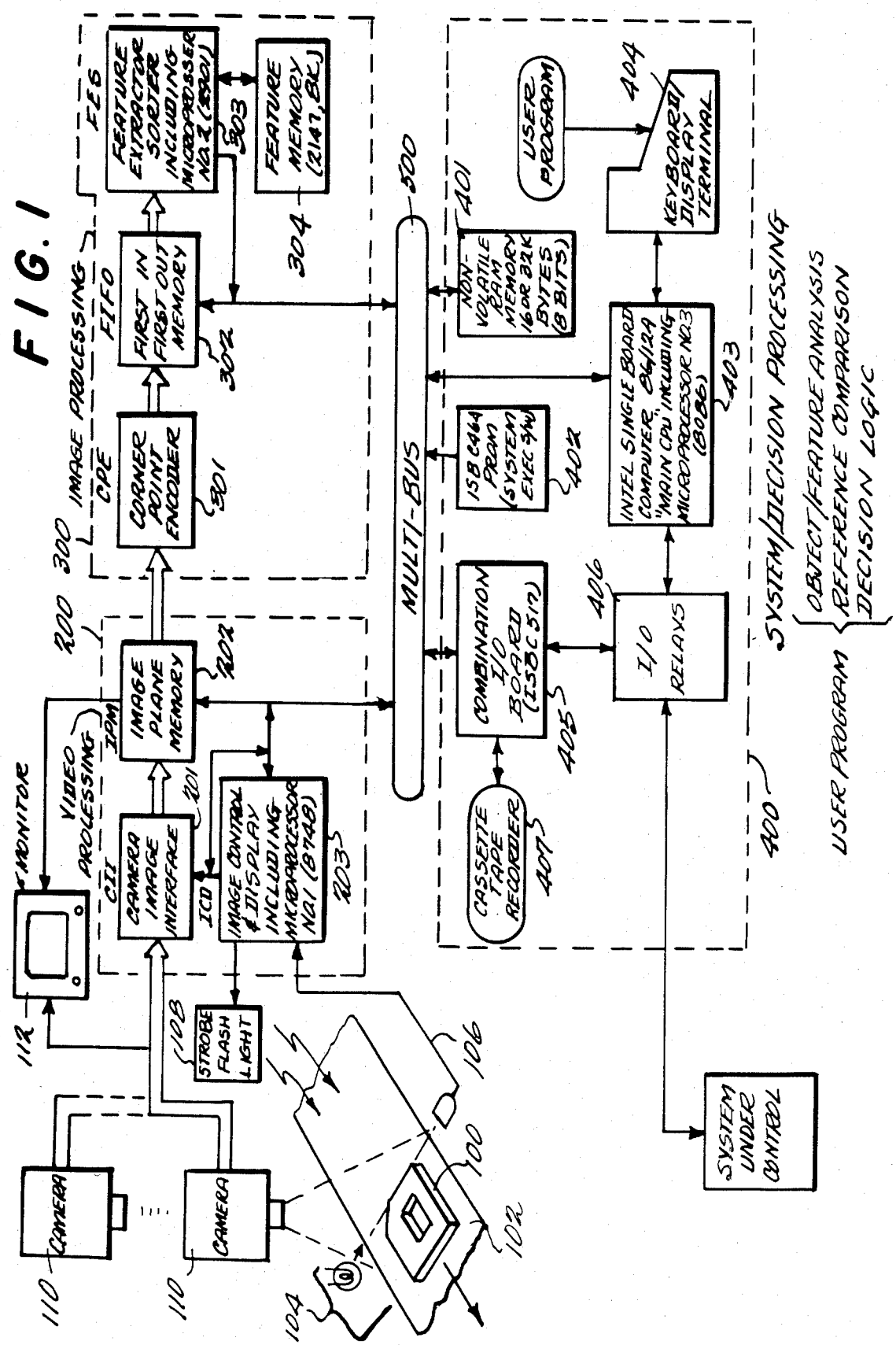
FIG. 1 is an overall block diagram of the system architecture employed in the presently preferred exemplary embodiment of this invention.
Figure 11:
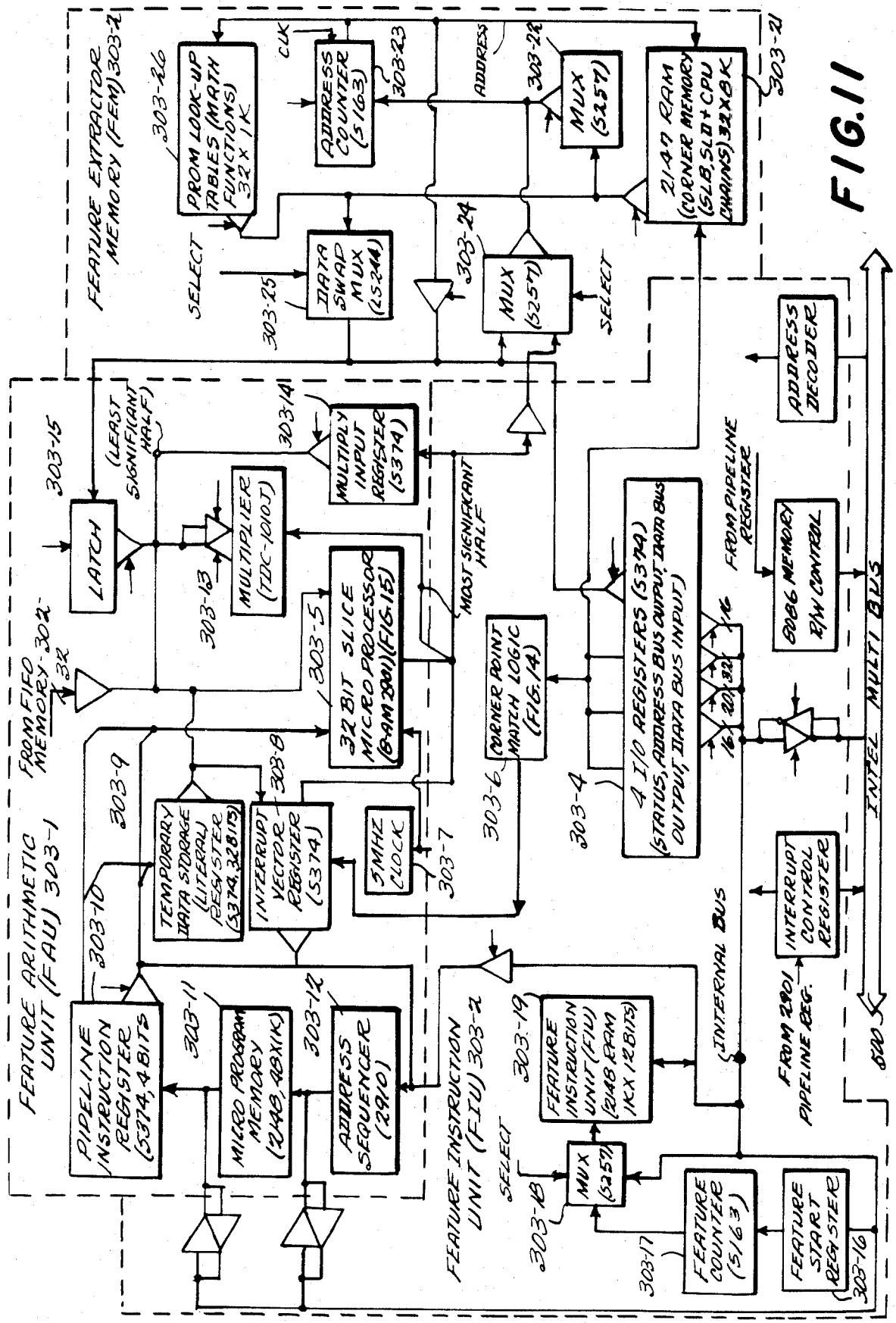
Figure 13:
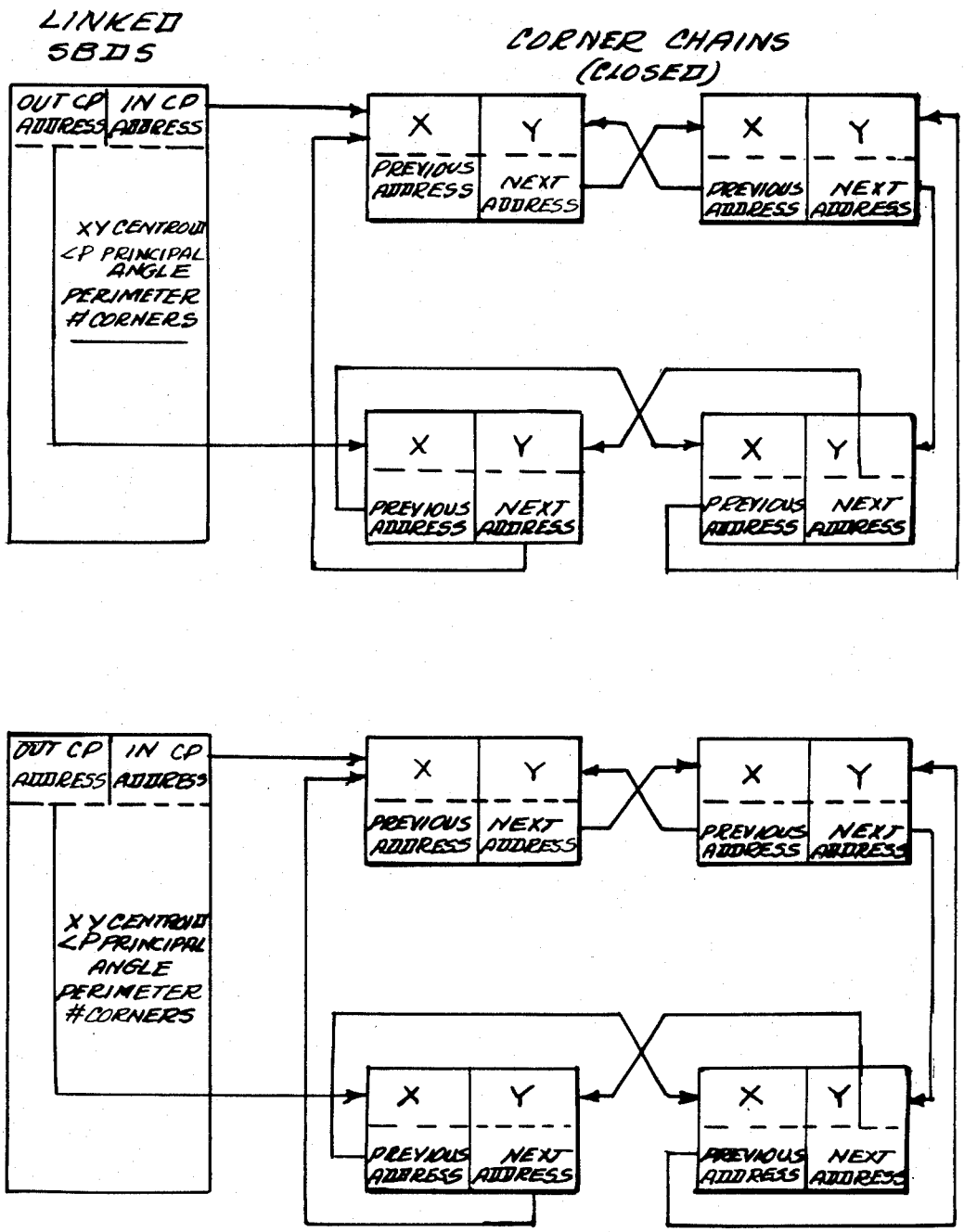
Figure 14:
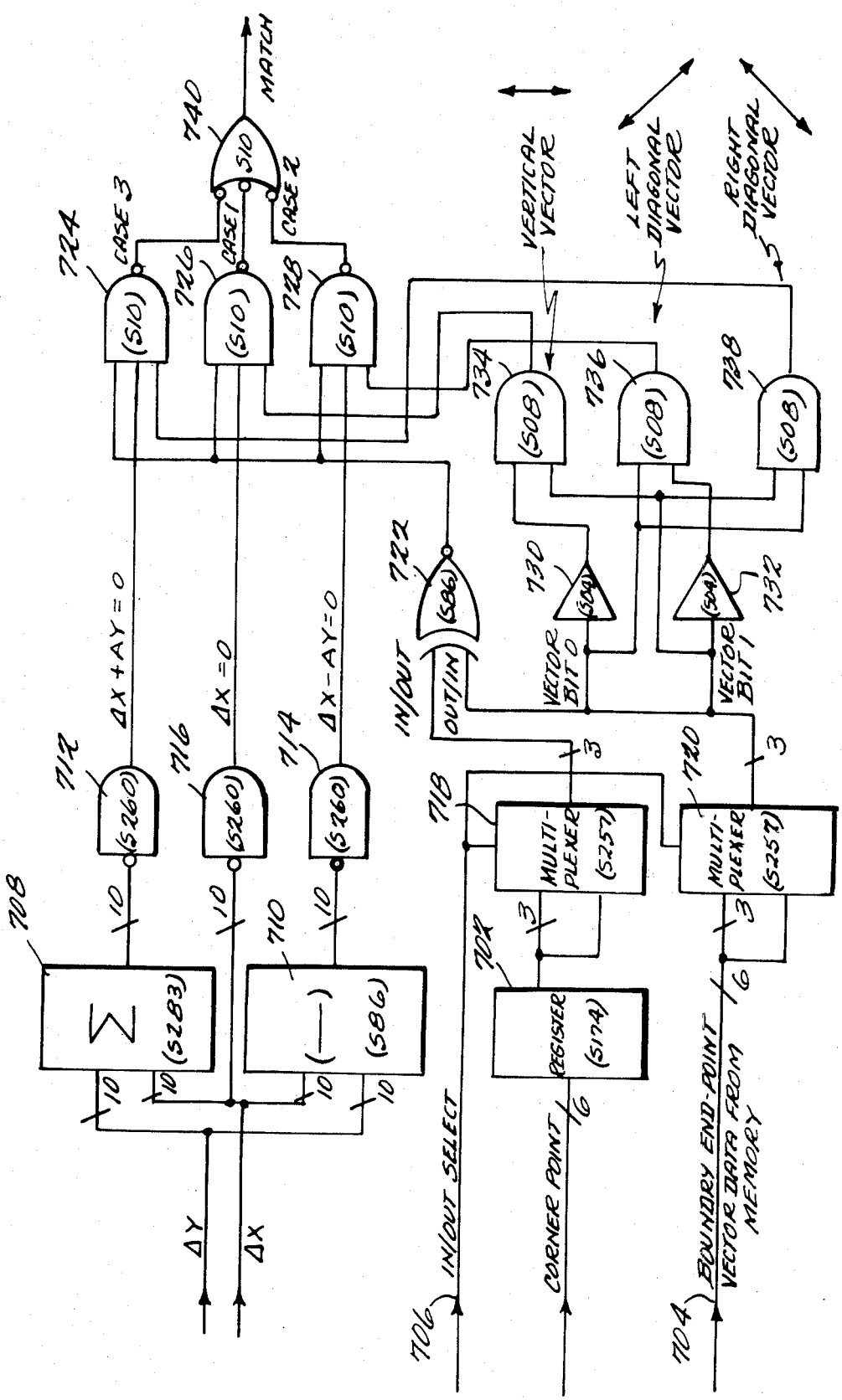
Figure 15:
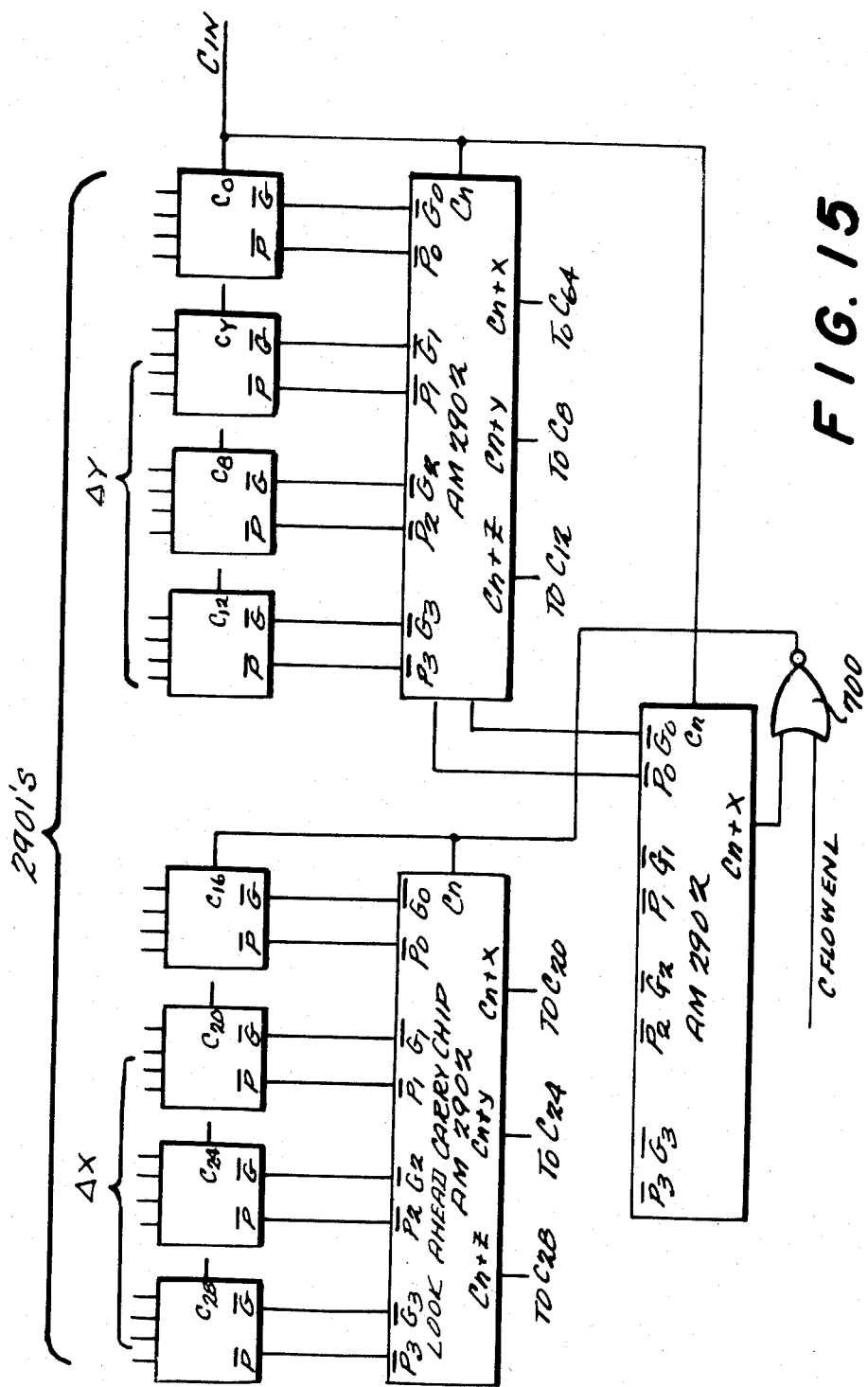
Figures 1, 16:
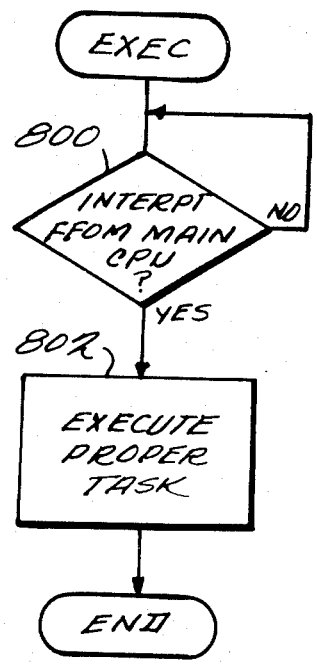
Figures 2, 16:
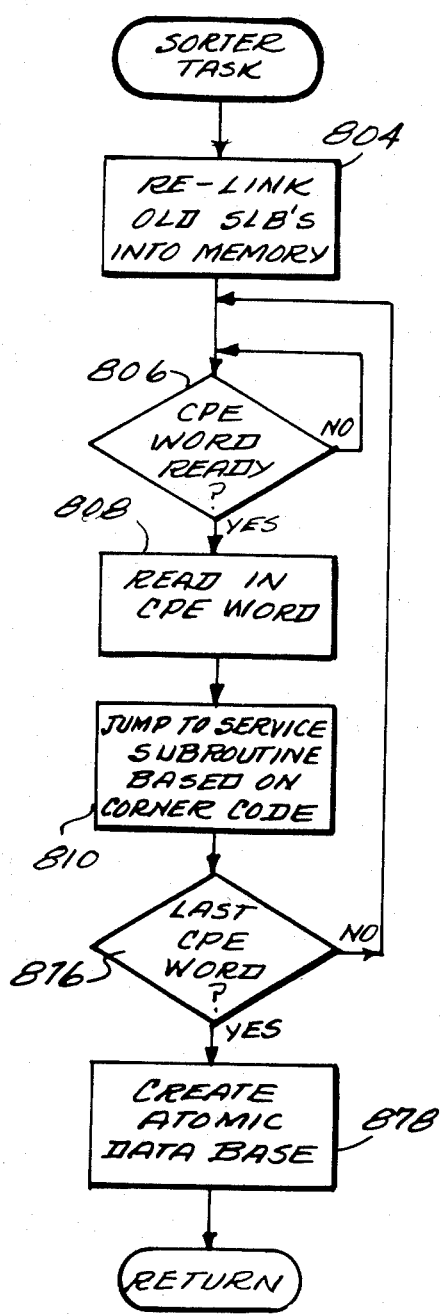
Figures 3, 16:
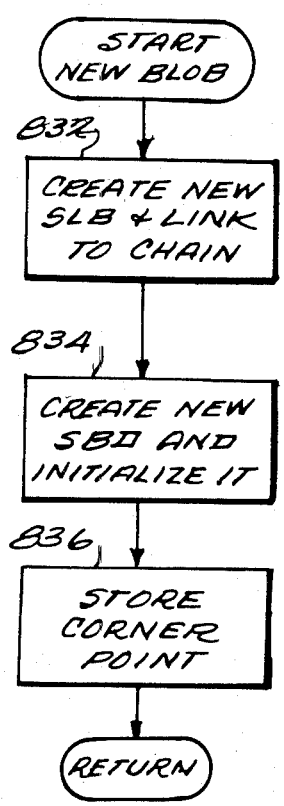
Figures 6, 16:
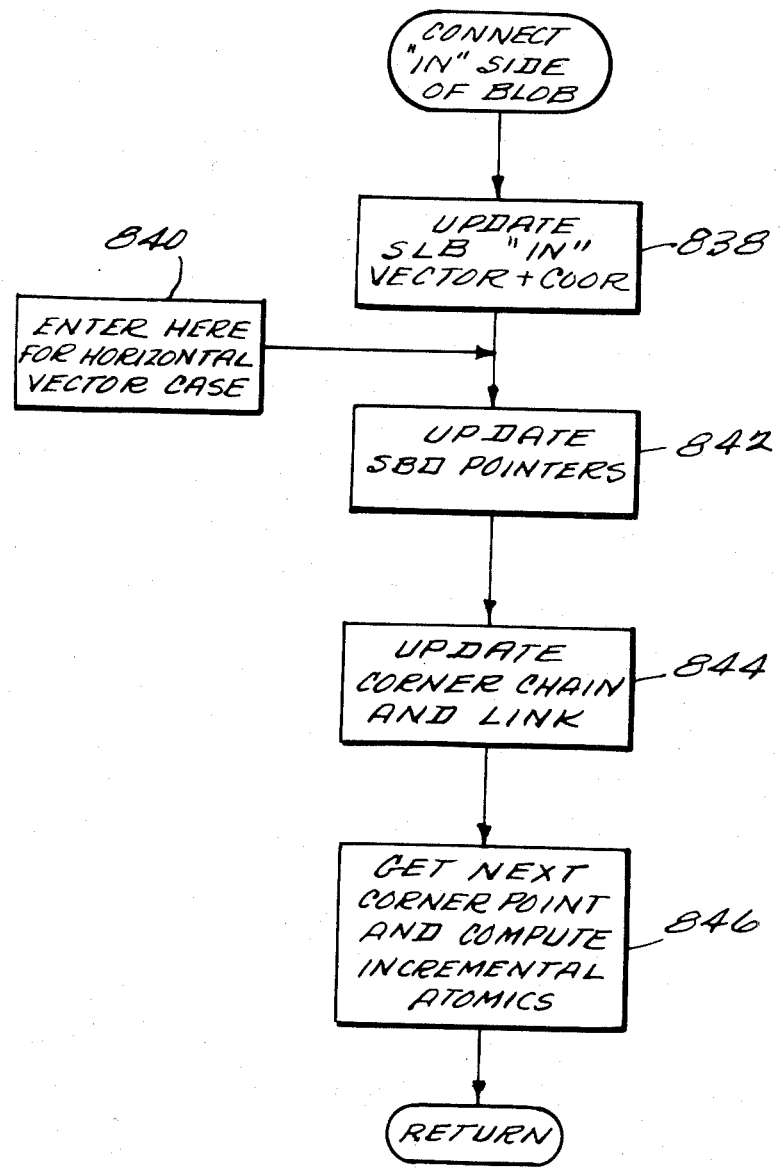
Figures 8, 16:
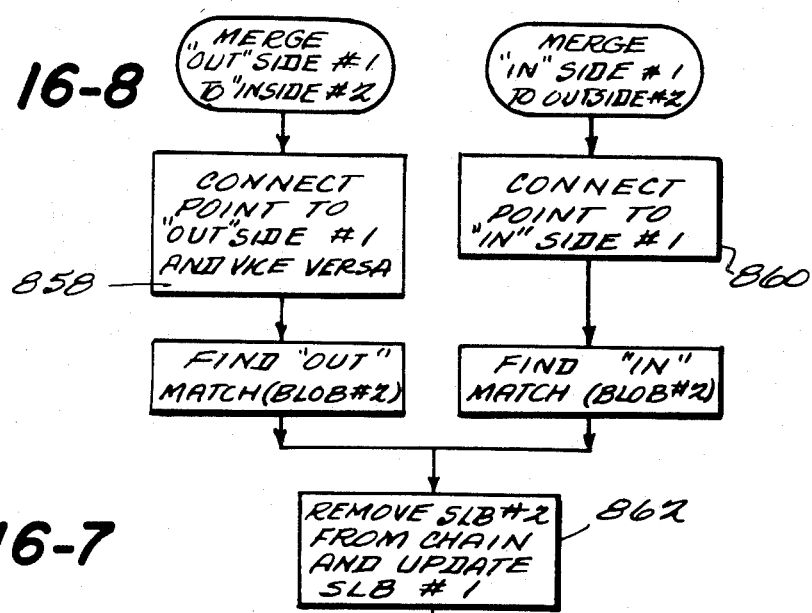
Figures 7, 16:
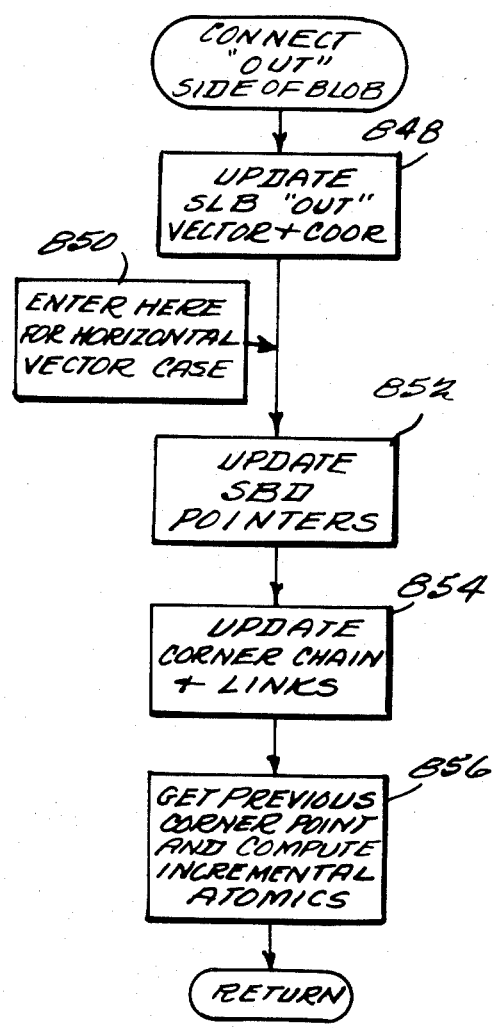
FIG. 7 is a more detailed schematic diagram of the corner point encoder shown in FIG. 1.
Figures 9, 16:
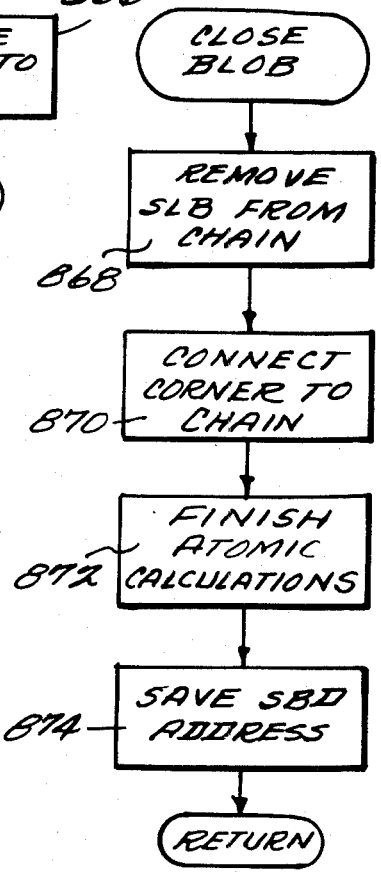
Figure 17:
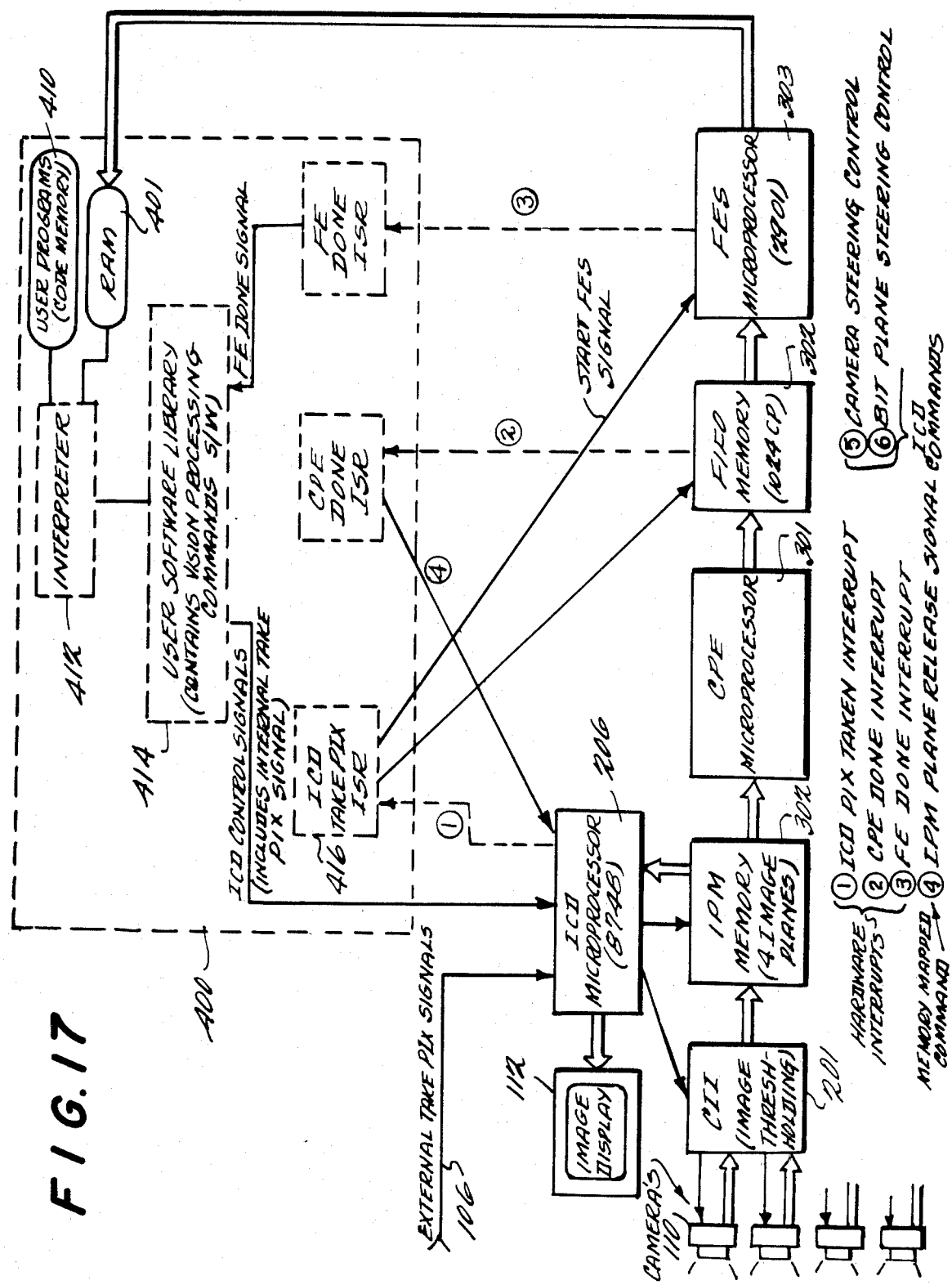
Figure 18:
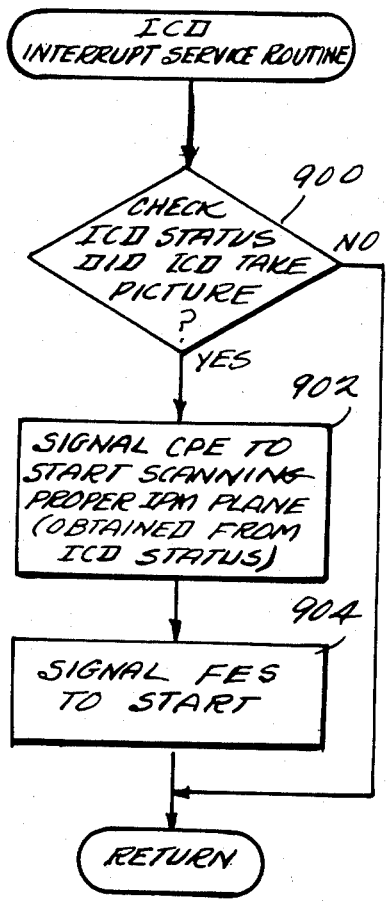
Figure 19:
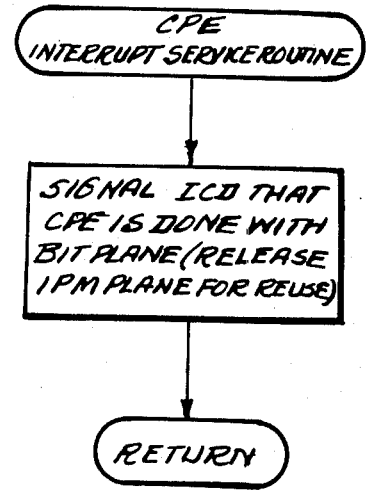
Figure 20:
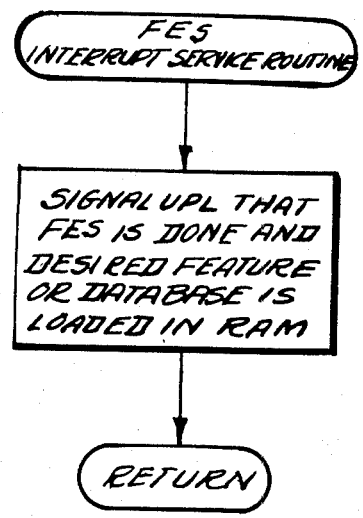
Figure 21:
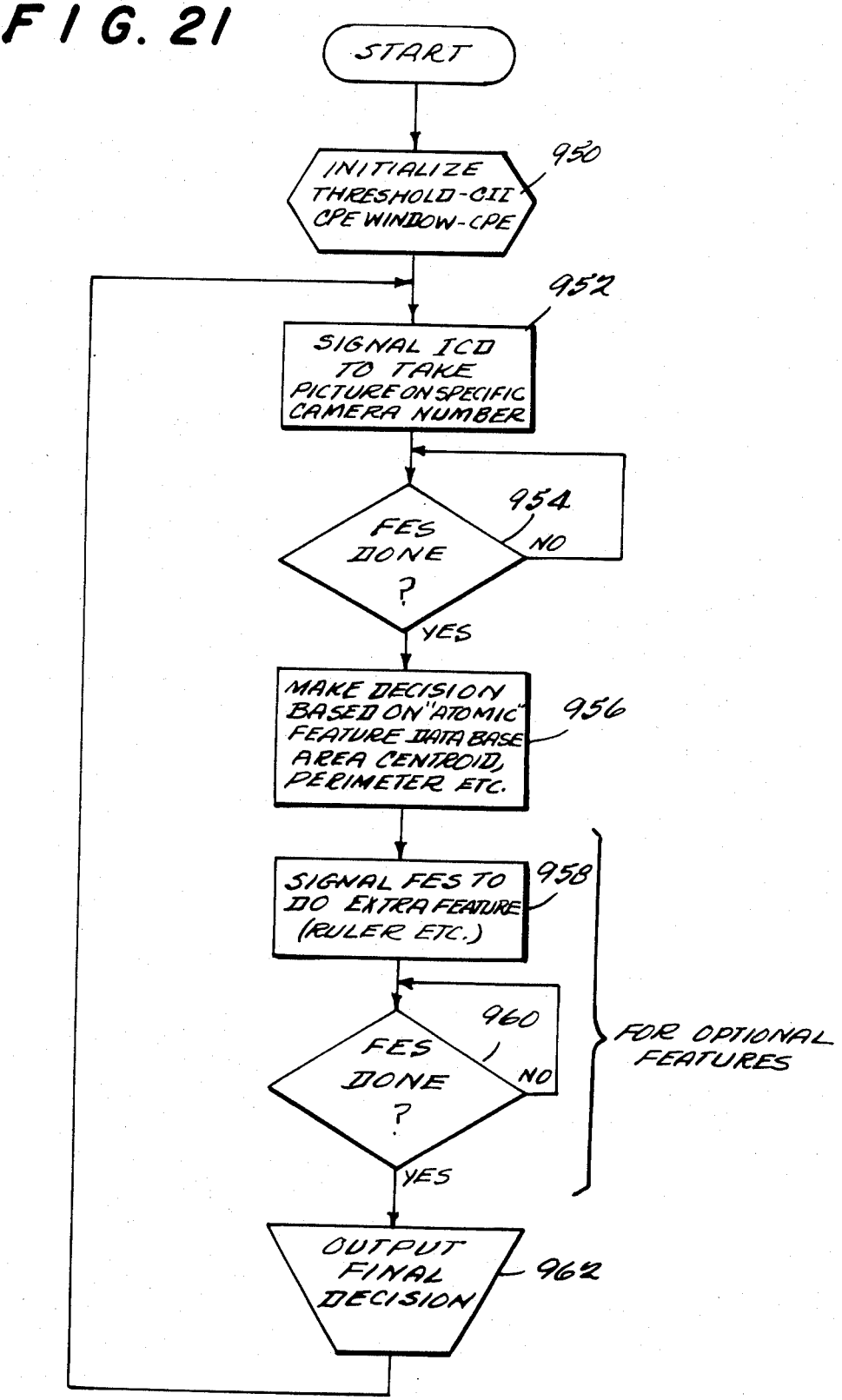

FIGS. 8–10 comprise flow charts of the hardwired program implemented in the corner point encoder of FIG. 7;

FIG. 11 is a more detailed schematic diagram of the feature extractor/sorter shown in FIG. 1;

FIG. 12 is a schematic depiction of the doubly linked organization of data within the corner memory of FIG. 11 depicting sort link block (SLB) data chains with each SLB also being linked to sorted blob descriptors (SBD) which are, in turn, linked to both free ends of previously linked corner point chains which, when finally closed, will describe a closed edge contour of the object under examination;

FIG. 13 is a schematic depiction of the organized contents of the corner memory shown in FIG. 11 after the corner point chains are completely linked or closed with each completely closed chain being linked to its own SBD which represents the output data from the feature extractor/sorter that is communicated to the core memory of the main CPU for access by user-generated decision processing;

FIGS. 14 and 15 are more detailed schematic diagrams of the dedicated decision logic hardware employed in the corner point match logic of FIG. 11;

FIGS. 16-1 through 16-9 comprise a flow chart of the firmware program employed for controlling the microprocessor of the feature extractor/sorter shown in FIG. 11;

FIG. 17 is a flow chart of the hardware/software interfaces with the program utilized to control the operations of the main CPU of FIG. 1;

FIGS. 18–20 depict exemplary interrupt service routines which the main CPU is programmed to perform in interfacing with the video processing and image processing subsystems; and FIG. 21 is a flow chart of an exemplary user-generated program for the main CPU.

The process or system to be controlled, analyzed or monitored by this invention may take many and varied forms. However, in the exemplary embodiment of FIG. 1, a typical application is depicted. Here, manufactured parts 100 are rapidly passed by a visual inspection station 104 on a moving conveyor belt 102. If the part is determined to meet acceptable criteria (e.g. predetermined quantized geometric features) it is permitted to pass uninterrupted on the conveyor belt or to be ejected into an "acceptable" bin or the like. On the other hand, if the part is determined to be defective, it is ejected from the belt into a "reject" bin (or perhaps permitted to continue if the acceptable parts are instead ejected from the belt). Typically, as many as 900 parts per minute may pass inspection station 104 and there may be plural similar conveyor belts and inspection stations requiring similar capabilities for similar or different manufactured parts. The exemplary embodiment of this invention may be capable of simultaneously servicing up to four such independent inspection stations, each of which may pass up to 900 parts per minute.

Typically, as shown in FIG. 1, the part 100 under inspection will itself interrupt a light beam or otherwise generate a "picture-taking" or "part-in-position" signal on line 106 which will, in turn, cause a conventional strobe flash light 108 (e.g., the General Electric Model PN 2120 strobe illumination system) and a conventional electronic video camera 110 capable of converting the visual field of view within inspection station 104 to a sequence of digital electronic video signals, each of which represents a corresponding elemental picture element (i.e. pixel) of the field of view. A new frame of such video signals is provided in response to each stimulation via line 106 (provided that such signals do not occur in excess of some predetermined upper limit such as 900 parts per minute).

A suitable conventional camera used with the presently preferred exemplary embodiment of this invention is a solid state CID) charge injection device) camera manufactured by General Electric Company and marketed under Model No. TN 2500. such video camera apparatus for capturing and reading out digitized video signals is also described in prior U.S. Pat. No. 3,805,062—Michon et al (1974) and U.S. Pat. No. 3,993,897—Burke et al (1976), both of which are, at present, commonly assigned herewith. As indicated in FIG. 1, additional cameras 110 (up to three) may be provided in the exemplary system so as to monitor up to four separate vision inspection stations if desired.

As shown in FIG. 1, the visual image processing system of this invention is divided into three major subsystems (in addition to the conventional camera inputs, the system under control or observation, the video monitor, etc.). In particular, the overall architecture of the system is divided into a video processing subsystem 200, an image processing subsystem 300, and an overall system/decision processing subsystem 400. These three subsystems are operatively interconnected via a common bus conductor system (e.g. Intel MULTIBUS TM) system of address, data and control conductors 500.

Each frame of digitized video data emanating from camera(s) 110, includes a 256 by 256 array of pixels with each pixel being represented by an eight bit digital word representing the detected gray level for a respectively corresponding pixel of the CID camera. To reduce the volume of data involved, each pixel value is immediately thresholded with a controllable digital threshold word (value) so as to result in but a single bit for each pixel. In effect, any pixel having a gray level equal to or greater than the threshold value will be represented by a single "1" valued bit (or alternatively a "0" valued bit) while any pixel having a gray level below the threshold value will be depicted by a single "0" valued bit (or alternatively a "1" valued bit). Such "thresholding" is one of the functions performed by the camera image interface (CII) 201.

The resulting 256 by 256 bit array of binary valued video data for a given image "frame" is then steered to a desired (i.e. available) plane of the image plane memory (IPM) 202 where it is temporarily stored (together with data identifying the camera from which it emanated, the frame sequence etc.) awaiting further processing by the image processing subsystem 300. The image control and display (ICD) module 203 includes microprocessor No. 1 (type 8748 in the exemplary embodiment) which has been programmed so as to synchronously control read out of IPM data to a video generator for the video monitor and, in the otherwise available time, to also control the CII 201 and the IPM 202, to accept the "part-in-position" input on line 106 and to generate in response appropriate output signals to trigger the strobe flash light 108 and the initiation of the readout cycle for the appropriate camera(s) 110.

Because the video processing subsystem 200 includes independent decision processing logic (including some dedicated hardware logic), it is enabled to quickly respond to the presence of a part within the inspection area of a monitored line so as to trigger the strobe flash to capture a frame of video data within the camera of that particular inspection area. As soon as time permits, a readout cycle of the appropriate camera(s) is initiated while substantially simultaneously thresholding the digital output of the camera and steering the resulting thresholded data to a currently available temporary buffer storage area within the image plane memory 202 so that it will be immediately available whenever the image processing subsystem 300 is next available for processing it.

In the exemplary system, all of these video processing subsystem functions are carried out under the general supervision of the main CPU in the overall system/decision processing subsystem 400 via the common bus conductors 500. New frames of video data are captured, thresholded and temporarily stored until needed by the video processing subsystem 200 requiring only a minimum of supervisory control by the system/decision processing subsystem 400. This division of labor permits the video processing subsystem 200 to perform these vital initial data compression and buffer storage functions for plural independent camera monitoring systems. Other functions are also performed by the video processing subsystem. For example, the video monitor 112 is synchronously fed digital video signals representing the contents of one or more selected planes within the image plane memory. Alternatively, the monitor 112 may be connected so as to directly receive and display the gray scale video output of any of the cameras 110 as may be desired.

In the exemplary embodiment, the image processing subsystem 300 signals the system/decision processing subsystem 400 whenever it finishes the processing of a frame of data and is thus next available for processing another frame. Thereafter, the main CPU in the system/decision subsystem 400 signals the video processing subsystem 200 to transmit another frame of thresholded and previously stored digital video data from the image plane memory 202 to the corner point encoder (CPE) 301 of the image processing subsystem 300. The corner point encoder 301 is, in the exemplary embodiment, a free running dedicated hardware device designed to automatically identify and encode corner points within an input frame of binary valued video data as will be explained in detail below.

A simple list of the x,y coordinates of the corner points as well as the IN and OUT vectors associated with each corner point is then stored in a "first-in-first-out (FIFO) memory 302 which acts as an output buffer for the corner point encoder 301. That is, a dedicated logic decision module is permitted to run freely to identify and encode corner points and to store them in the FIFO buffer memory 302. Accordingly, this function may be performed substantially independently and asynchronously with respect to the other ongoing functions being performed within the overall system.

The list of unsorted but encoded corner points in FIFO memory 302 may then be accessed as required by another dedicated decision logic module, the feature extractor/sorter (FES) 303 (including microprocessor No. 2 which, in the exemplary system, is a type 2901). The feature extractor/sorter 303 identifies and constructs closed linked sets (sometimes referred to as chains, subsets, lists, etc.) of the corner points first identified by the corner point encoder 301 in feature memory 304.

In the exemplary embodiment, many of the desired geometric features to be associated with each thus identified closed edge contour of the object under examination are incrementally calculated during the sorting process. That is, each time a corner point is added to a linked chain of such points (which will eventually, when closed, represent a closed edge contour), an incremental calculation is made of the perimeter, area, centroid, principal angle, maximum-minimum xy boundaries, etc.) by making these calculations incrementally as each new corner point is associated with a linked list of corner points, an overall time saving is often possible when compared with a more traditional approach which waits until the entire closed edge boundary is identified before performing and summing similar incremental calculations. This is so because the incremental calculations can often be performed right at the time a new corner point is linked to a given chain while the image processing subsystem 300 is otherwise performing steps required to initiate the identification of yet another linked corner point. In other words, time that might otherwise be spent only in setting up the decision logic to identify another linked corner point may be simultaneously used to perform incremental calculations of predetermined geometric features that have to be made at some point anyway. The resulting linked lists or chains of corner points identifying closed edge contours of the object under test as well as many quantized geometric features of such contours are thus formed in the feature memory 304. Such data is thereafter transferred via the common bus conductor system 500 to an on-board RAM within the main CPU 403 of the system/decision processing subsystem 400.

The system/decision processing subsystem 400 is a typical microprocessor-based system having a core memory 401 for storing data that is to be directly accessed by the main CPU and a PROM memory 402 for storing computer programs (e.g. user-generated programs, system and/or executive programs, etc.). Its overall operation is controlled by a main CPU which, in the exemplary embodiment, is an Intel single board computer 86/12A which includes an 8086 microprocessor (the 3rd microprocessor in the exemplary embodiment). The main CPU 403 communicates with a conventional keyboard/display terminal 404 via a conventional RS232 communication link. Standard combination input/output boards 405 and/or conventional I/O relays 406 are provided for generating suitable drive signals to reject/accept actuators or other conventional components of the system under control or observation. If desired, a mass storage device (e.g. a cassette recorder) 407 may be provided for storing additional user-generated computer programs or the like. User-generated programs may of course be originally input via the keyboard 404 or through an I/O device such as the recorder 407.

As will be appreciated, once the closed edge contours within a given frame have all been identified (each by a closed linked set of corner points) and/or once the predetermined geometric features calculated by the feature extractor/sorter 303 have been quantized and stored in the RAM memory within 403, user-generated programs may be designed as desired to analyze such closed edge contours, to compare these quantized parameters with previously stored comparison parameters and/or to otherwise devise suitable decision logic for accepting/rejecting or otherwise analyzing the closed edge contours under examination. In the exemplary system, each closed edge contour is represented by a closed linked set of corner point coordinate data which is itself linked to a collection of data describing predetermined geometric features of the "blob" thus defined (e.g., the number of corner points involved, the maximum and minimum x,y coordinates, the x,y coordinates of the centroid, the area, the perimeter, the x,y coordinates of the principal angle, etc.). Other features of the thus identified and described "blob" may of course be quantized and/or otherwise analyzed by user-generated decision logic as may be desired.

Figure 2:
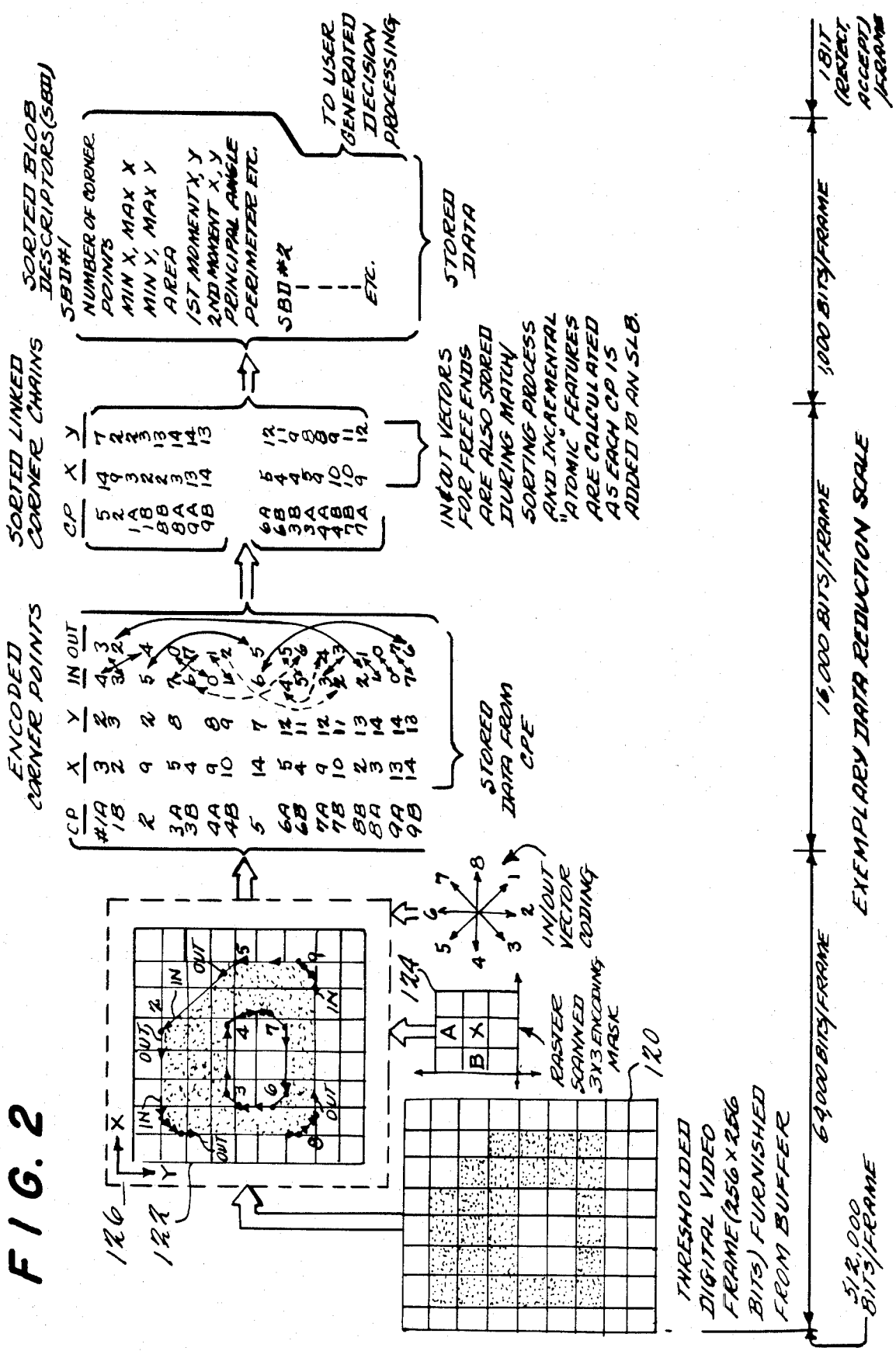
FIG. 2 is a graphical depiction of the corner point encoding and sorting process utilizing Freeman chain codes as employed in the exemplary embodiment of this invention shown in FIG. 1.

The overall functions being performed in this system are generally depicted at FIG. 2. Although a frame of digital video data in the exemplary system actually comprises 256×256 pixels, the example shown in FIG. 2 has been simplified to an 8×8 array of pixels. The thresholded (e.g., binary valued) digital video data for one frame is depicted at 120 to represent a rectangular part having one corner cut off at a 45° angle and an inner rectangular hole slightly displaced toward the lower left from the center of the part. As will no doubt be understood, the shaded pixels of this 8×8 array would be represented by a binary "1" value (or, alternatively, a "0" value) while the unshaded pixels would be represented by a "0" value (or, alternatively, a "1" value).

As shown at 122 in FIG. 2, the outside closed edge boundary of the object under examination is represented by a sequence of eight "corner points" having "IN" and "OUT" vectors associated therewith which define a counterclockwise-directed closed edge contour when successively linked together in the order of their appearance in a counterclockwise circuit. Similarly, the inside closed edge contour of the "hole" of the object under examination is represented by eight "corner points" each of which has an "IN" and an "OUT" vector associated therewith such that they define a clockwise-directed circuit of this edge contour if these corner points are appropriately linked in a closed set. It should now be appreciated that the useful information content of the image depicted in FIG. 2 can be simply represented by two linked lists of eight corner points each. That is, if one knows the x,y coordinates of all the corner points and also knows the sequence with which these corner points are to be linked so as to traverse a closed edge contour, then the geometry of this contour and hence of this portion of the object under test is quantitatively determined with the result then being available for user-generated decision testing to see if the object meets predetermined specifications or to "recognize" an object, etc.

The general technique of uniquely defining corner points (having x,y coordinates and IN/OUT vectors) about the edge contours of a binary-valued image, then uniquely linking such encoded corner points into associated lists together defining the image, probably can be implemented using many possible variations of corner encoding and sorting processes. The preferred implementation in accordance with the present invention uses a 3×3 pixel encoding mask 124 which is (conceptually) raster scanned from left-to-right, top-to-bottom of the thresholded digital video data frame. That is, the center pixel of this 3×3 pixel encoding mask (marked with an X in FIG. 2) is successively scanned in a raster-like fashion over the thresholded digital video data frame one pixel at a time, from left to right, top to bottom. So as to permit the encoding process to proceed even at the edges of a frame and to also ensure that each edge contour in a given frame is indeed a "closed" edge contour, an outer "0" valued boundary 126 which is one pixel wide may be (conceptually) added about the periphery of a frame before the 3×3 encoding mask is passed over the pixels of the actual data frame.

At any given location during this scanning process, there are 512 possible contents of the 3×3 pixel encoding mask. In accordance with a predetermined look-up table, some of these 512 combinations may be defined as representing one or more valid corner points. For example, referring briefly to FIG. 5, one of the 512 possible contents of the 3×3 encoding mask is depicted which may be considered to define a corner point A. To permit a "matched" connection with another corner point about a closed edge contour of the object under examination, both "IN" and "OUT" vectors are defined for each corner point in accordance with the IN/OUT vector coding diagram shown in FIG. 2 (i.e., codes 0–7 to represent successive 45° increments in a clockwise direction starting from an initial horizontal vector "0" directed to the right).

Figure 5:
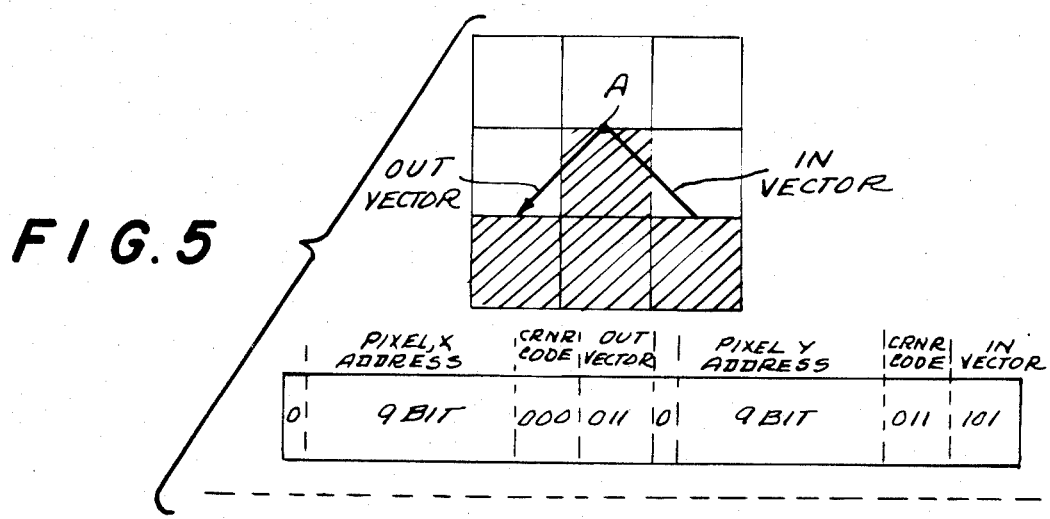
FIG. 5 illustrates the manner in which a detected corner point within a 3×3 pixel matrix may be identified and encoded; and the resulting exemplary format of a 32 bit digital word generated by the corner point encoder of FIG. 1.

For example, for the exemplary corner point A of FIG. 5, the IN vector would have a value of 5 and the OUT vector would have a value of 3 in accordance with this IN/OUT vector coding scheme. To ensure unique coding of corner points in this fashion so that they may be later uniquely sorted into sets which define completely closed edge contours, if a corner point is defined at any given pixel position of the 3×3 pixel encoding mask 124, it is considered to be located either in position A or in position B as depicted in FIG. 2. In some cases, "double" corner points may be defined by a given content of the 3×3 encoding mask. For example, the first corner point situation encountered in raster scanning of the example shown in FIG. 2 defines such a double corner point which actually comprises two separate corner points 1a and 1b each having x,y coordinates and IN/OUT vectors as depicted in FIG. 2.

The 3×3 pixel encoding mask configuration enables complete encoding of a video data frame on a single pass, thus avoiding the need for frame buffer storage as in multiple-pass encoding schemes. This 3×3 configuration also is of advantage in facilitating single pixel noise cancellation. Any time when the pixel which is centered in the 3×3 window is different from all of its immediately neighboring pixels within the window, such single pixel may be assumed to represent noise and the pixel data may be discarded thus affording significantly improved noise immunity with only small additional system complexity and cost.

As will be explained in more detail below, the corner point encoder 301 is especially designed to perform this raster scanning, corner point detection and encoding function on command so as to produce a complete list of encoded corner points (stored in the FIFO memory 302) for each frame of thresholded video data as it is supplied thereto from a selected IPM plane. The exemplary listing of such encoded corner points in FIG. 2 has been denoted in base 10 numerical notation for explanatory purposes although it will be appreciated that the quantized x,y coordinates and IN/OUT vectors are actually quantized using base 2 numerical notation in the exemplary embodiment. For example, the format of a 32-bit binary word used in the exemplary system FIFO memory 302 for storing successive detected and encoded corner points is shown in FIG. 5. As may be seen, 18 binary bits are provided for storing the pixel x,y coordinates while six binary bits are provided for storing the OUT/IN vector codes associated with that corner point. Six binary bits are also provided for a "corner code" which may be used to identify particular types of detected corners. For example, if a "double" corner is detected, it may be sufficient to merely store the x,y coordinates and IN/OUT vectors for one of the corner points together with a suitable "corner code" that may subsequently be translated (e.g. by the FES) into a second or B encoded corner point word having x,y coordinates and IN/OUT vectors which differ by predetermined known factors from the x,y coordinate and IN/OUT vector data actually stored for the first or A corner point. In this way, two related or "double"-corner points may be stored in the FIFO memory utilizing only a single 32-bit word instead of requiring two 32-bit words so as to separately store each actual corner point. The two remaining "sign" bits associated with the x,y coordinates of the encoded corner point word shown in FIG. 5 are not used in the exemplary embodiment.

Analysis of the encoded corner point list of FIG. 2 reveals that corner points 1a and 1b, for example, should be "linked" so as to at least partially define a closed outer edge contour. For example, the differences x and y (between x coordinates and between y coordinates) for these corner points are equal (signifying a 45° line would connect these corner points) while the "OUT" vector for corner point 1a equals or "matches" the IN vector of corner point 1b. It is also apparent that corner point 2 should be linked to corner point 1a since it is the next successive corner point encountered in the same line of the raster scanning process (thus insuring that its y coordinate is equal to the y coordinate of corner point 1a) and its OUT vector equals the aligned IN vector of corner point 1a. By performing such decision logic, the encoded corner points in FIG. 2 may be sorted into a linked corner block (SLB) chain (e.g. see solid and dotted arrows illustrating linkage).

Once such basic connectivity decisions have been made, the IN/OUT vector data may be discarded since a completely closed linked set of corner points individually defined by respective x,y coordinates is sufficient to define a closed edge contour. In the example shown at FIG. 2, there are two such closed edge contours and they are represented by the two SLB chains depicted in FIG. 2. In the exemplary embodiment, the x,y coordinates for each corner point are stored together in one 32 bit word together with linking addresses to the previous and to the subsequent corner point data word in the chain so as to form a completely closed linked set of corner point coordinate data.

During the corner point matching process, the IN/OUT vectors for the free IN and OUT corner points of a partially linked (i.e., not yet closed) set of encoded corner points are also stored in a linked list (SLB chain) so as to permit them to be tested for a "match" against other encoded corner points not yet sorted into a particular corner point chain. The match determination is made by the corner point match logic hardware. Furthermore, as soon as another corner point is sorted into a given corner point chain, advantage is taken of any available data processing time to immediately make incremental calculations of predetermined "atomic" geometric features thus avoiding the necessity to make all such calculations at one time after the entire SLB has been defined. Once all of the encoded corner points have been sorted into their proper chain, sorted blob descriptor (SBD) data is thus quickly available for each chain so as to quantitatively supply certain predetermined geometric features of the thus described blob. In the example shown at FIG. 2, each SBD may include data identifying the number of individual corner points included within a given blob, the minimum and maximum x,y coordinates of the blob (thus defining a minimum "window" or "box" which contains the blob), the x,y coordinates of the centroids for the blob (assuming a homogeneous blob of uniform thickness), the principal angle, perimeter, etc. These quantized descriptive data are then stored in other memory facilities available to user-generated decision processing logic and represent the useful basic information gleaned by the visual image processing system of this invention for each frame image.

The overall process depicted in FIG. 2 represents a considerable data reduction process. For example, the gray scale valued digital data actually provided by the camera represents approximately 512,000 bits per frame. After the initial thresholding process, each frame is represented by only about 64,000 bits. Assuming that the frame contains on the order of 500 corner points, the useful information in the frame may be represented by approximately 16,000 bits per frame of encoded corner point and SLB data. If only one blob is identified in a given frame, then the SBD for that blob may be contained within approximately 1,000 bits per frame. Ultimately, the user-generated decision processing logic will analyze the data contained within the SBD so as to generate perhaps only a single bit per frame (i.e., reject-/accept).

Figure 3:
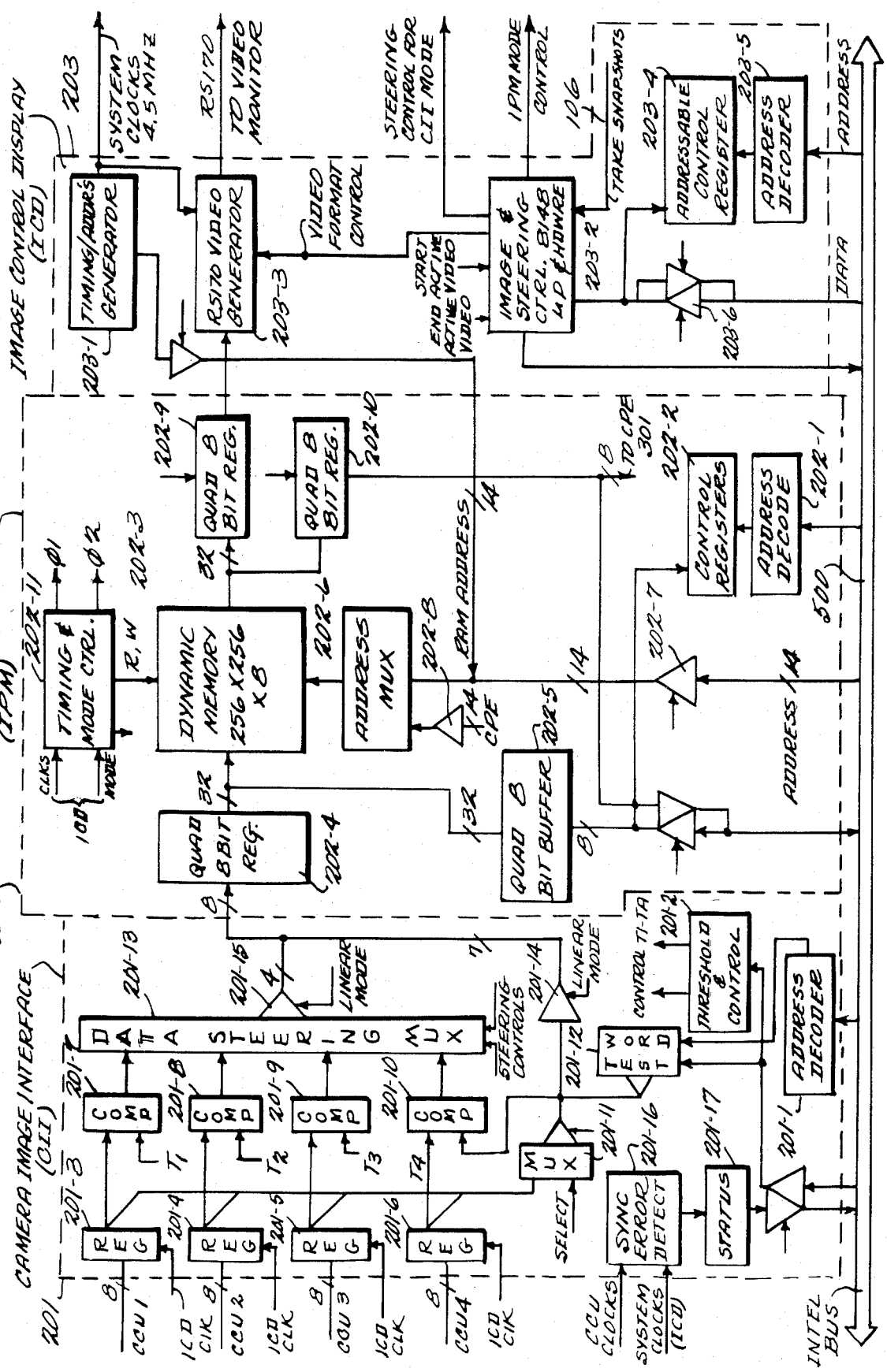
FIG. 3 is a more detailed schematic diagram of the video processing subsystem shown in FIG. 1.

The video processing subsystem 200 is shown in more detail at FIG. 3. The timing for this entire subsystem is provided by timing generator 203-1 which produces system clock signals at an approximately 4.5 mHz rate and also drives the video generator 203-3. In the exemplary embodiment, the timing generator 203-1 is included as a part of the image control and display unit 203 which also includes an 8748-type microprocessor-based data processing system 203-2. This processor is programmed so as to synchronously supply video data to a conventional video generator 203-3 so as to provide one source of video signals for the video monitor 112. The "end active video" and "start active video" signals are supplied by the timing generator 203-1 and/or the video generator 203-3 so as to permit the 8748 microprocessor to synchronize its operations with the need to synchronously supply video data input to the video generator from the IPM . In the available data processing time otherwise available, the 8748 is also programmed:

(a) to accept a "picture-taking" or "part in position" interrupt signal on line 106 (also shown in FIG. 1), (b) to produce mode control signals for the image plane memory, (c) to provide data steering and mode controlling signals for the camera image interface 201 (as well as charge injection inhibition signals to the camera effectively causing the camera CID elements to act as a temporary storage buffer until a desired frame of data may actually be read therefrom into the IPM) and activate the strobe light 108, and (d) to control interrupt, data transfers, acknowledgements, etc., with the main CPU 403 via the common bus system 500.

For example, the main CPU 403 may issue control information to the ICD 203 by addressing particular addressable control registers 203-4 through a conventional address decoder 203-5 on the address line of bus 500 while data is transferred to the desired control register via the data lines of bus 500 and conventional controllable tri-state buffers 203-6 (whose control inputs may be provided by the outputs of the address decoder 203-5, as should be appreciated). Similar address decoders 202-1 and 201-1 as well as further addressable control registers 202-2 and 201-2 are respectively provided in the image plane memory 202 and camera image interface 201 so as to similarly permit the reception of data signals from the main CPU 403.

The camera control units (CCU), a conventional unit supplied with the GE Model TN-2500 camera, provides eight parallel bits per pixel. As shown in FIG. 3, each camera output is synchronously clocked into a respective 8-parallel bit register (typically 74LS374) 201-3 through 201-6. Four 8-bit digital threshold values T1-T4 are supplied by the main CPU 403 via the addressable registers 201-2. These digital threshold values T1-T4 are supplied to respective comparators (typically 74LS85) 201-7 through 201-10 as shown in FIG. 3. Each 8-bit gray level valued pixel signal from registers 201-3 through 201-5 is also directly connected to another input port of respective comparators 201-7 through 201-9 as shown in FIG. 3 such that the outputs of these comparators directly represent binary thresholded digital data emanating from a respective one of three different cameras. That is, whereas the camera input to the CII 201 includes eight bits per pixel in a 256×256 array of pixels for each frame of video data, the output from the thresholding comparators includes only a single binary valued bit for each such pixel.

To provide added flexibility, the second input port for comparator 201-10 is not connected directly to the output of register 201-6 (which is, in turn, associated with CCU 4). Rather, the second input of comparator 201-10 is taken from the output of multiplexer 201-11 or, alternatively, as a test word provided by register 201-12 (which constitutes another addressable register which may be filled by the main CPU 403 via the bus system 500). Thus, the second input of comparator 201-10 may be selectively controlled by the main CPU 403 to perform special functions. For example, the output of a given camera could be simultaneously thresholded against two different threshold values to provide two respective frames of thresholded data which may be individually analyzed with the resulting feature data being processed so as to provide desired user-generated image analysis. For example, if the part under inspection is comprised of two different parts having quite different reflectivities, then images of the parts might be effectively separated by such dual thresholding techniques. Of course, multiplexer 201-11 might also be controlled so as to normally pass the output of register 201-6 to the second input of comparator 201-10 thus providing one thresholded bit per pixel per camera to the data steering multiplexers 201-13 (typically LS253). By applying suitable steering controls to the multiplexers 201-13, any one of the four incoming single bit lines may be connected to any one of the four outgoing single bit lines. This feature also provides added flexibility to the system. For example, if camera No. 1 is monitoring a process which requires extremely high frame rates while camera No. 2, for example, is monitoring another line which produces only very low frame rates, a frame from camera No. 1 may be steered onto the multiplexer output line normally used for camera No. 2 or other output lines as they are from time-to-time available for this purpose.

A linear or gray-scale mode of operation is also permitted for special purposes (e.g., to drive the video monitor) by controlling tri-state buffers 201-14 to pass a 6-bit gray-scale signal (the two least significant bits of the camera output are dropped) via multiplexer 201-11 from any desired one of the four cameras. Three of the output lines from tri-state buffers 201-14 are shared with the output from tri-state buffers 201-15 at the output of multiplexers 201-13. Accordingly, there are actually eight data bit lines at the output of the CII 201 for transferring video data to the IPM 202 as shown in FIG. 3.

The synchronization error detector 201-16 shown in FIG. 3 is preferably also included to compare the CCU clock signals with the ICD system clock signals. If excessive synchronization errors are detected, suitable status indicators and data output registers 201-17 are provided so as to alert a supervising operator as well as the main CPU 403 via the bus system 500.

As previously indicated, the input 8-parallel bit registers are synchronously clocked by system clocks from the ICD so as to simultaneously present their respective output words to the thresholding comparators. The digital threshold words (as well as proper multiplex selection control signals for the fourth channel) are transmitted to the addressable data and control registers 201-2 by the main CPU 403 via the bus conductors 500. Other shorter term steering control signals, mode controlling signals (i.e., linear mode or non-linear) signals are generated by the ICD 8748 microprocessor. In other words, the longer term data and control signals which change relatively infrequently are supplied by the main CPU 403 but other data and/or control signals which require faster response times are supplied by the distributed logic of the 8748 microprocessor in the ICD 203.

The dynamic image plane memory 202-3 in the exemplary embodiment is not capable of directly handling the approximately 4.5 mHz data rates present on the 8-bit data output channel provided by the CII 201. Accordingly, a 32-bit register 202-4 (typically 74LS374) is connected to be cyclically filled on four successive clock cycles so as to act as buffer storage and effectively reduce the data rate actually presented to the dynamic memory 202-3 to a level that can be handled (e.g. about 1.125 mHz). It will be seen that a similar 32-bit buffer register 202-5 may be filled with overlay frame data from the main CPU 403 via bus system 500 and presented to the input of the dynamic memory 202-3.

In the exemplary embodiment, each frame of thresholded video data comprises only 256×256 bits and there are eight such planes of dynamic memory 202-3 provided for temporarily storing such data until it can be processed by the image processing subsystem 300. The dynamic memory is normally addressed in a cyclical fashion by address signals conventionally generated in the ICD timing generator 203-1 via address multiplexer 202-6 (typically MC3242). However, alternatively, addressing of the dynamic image plane memory 202-3 may be effected directly by the main CPU 403 via bus system 500 and tri-state buffers 202-7 or from selected outputs of the CPE of the image processing subsystem via tri-state buffer 202-8. The output of the dynamic memory 202-3 is accumulated in two 32-bit registers 202-9 and 202-10 (typically type 74LS374) from which it is read out at a higher (approximately 4.5 mHz) bit rate over an 8-parallel bit output data channel. The output of register 202-9 provides the video input to the video generator 203-3 previously discussed while the output of register 202-10 provides output to the corner point encoder 301 or, if desired, to the main system/decision processing subsystem 400 via bus conductors 500.

Figure 4:
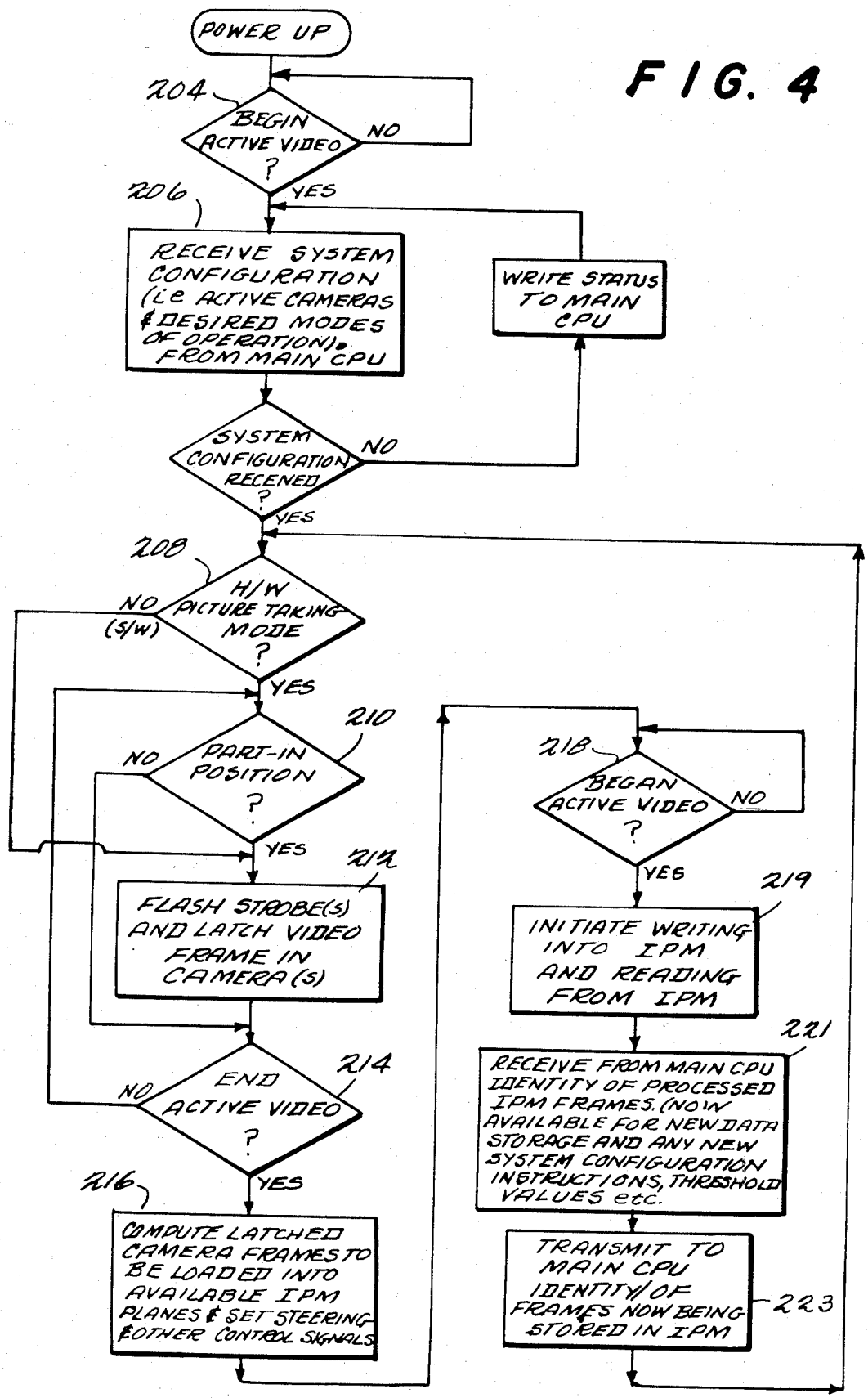
FIG. 4 is a flow chart of an exemplary firmware/hardware program used in the video processing subsystem shown in FIGS. 1 and 3.

The dedicated decision logic flow diagram for control of the video processing subsystem 200 is shown at FIG. 4. Initially, after power is applied, decision loop 204 is entered until the video generator 203-3 is ready to begin an "active video time" (i.e. the raster scanning of the video monitor). At this time, microprocessor 203-2 generates an interrupt signal to the main CPU 403 (such an interrupt is generated only once each frame, approximately each 33 milliseconds). Once the main 8086 microprocessor has been interrupted at task 206, it writes system configuration control signals into addressable registers within the video processing system as previously described. The main CPU 403 is thus permitted to define which cameras are to be active, which overall modes of operation are to be followed in the various components of the video processing subsystem, etc.

After receiving such initialization and control information from the main CPU at block 206, decision block 208 is entered. Here, a test is made to see whether the system has been configured so as to permit hardware triggering or software triggering of the picture-taking function. If hardware triggering is indicated, then decision block 210 is entered until a part of one of the monitored lines moves into position so as to generate a "part in position" or a "take snapshot" signal on line 106 (see FIG. 1). Once such a hardware generated trigger signal is detected, then at block 212, the ICD generates appropriate control signals to energize the appropriate strobe lamp and to inhibit further charge injection in the appropriate CID camera (i.e., in effect to latch a snapshot of the predefined field of view for the camera within the CID array of that camera). Thereafter, a test is made at 214 to determine whether there is available time for the ICD microprocessor 203-2 to perform the necessary computations required for steering and storing the data that is now present in the camera of interest. Typically, such ICD computation time is begun (and completed) during the vertical retrace time of the video monitor so that the ICD microprocessor 203-2 may properly drive the video generator 203-3. When an available computation time is detected at 214, the ICD microprocessor performs task 216 which determines which cameras now contain data that is to be thresholded and loaded into the IPM. Another test is made at 218 to wait for the onset of the next "active video time" and thus ensure that the ICD microprocessor is not interfering with any required active video time. When the onset of such a time is detected, then the ICD microprocessor 203-2 is programmed at 219 to initiate the readout of complete frames of camera data from the selected cameras to available planes of the dynamic memory 202-3 and, simultaneously, to supply the requisite video data input to the video generator 203-1 from the IPM. Preferably each camera is normally assigned to a predetermined IPM plane. However, if the normally assigned plane is temporarily unavailable, then any other available plane is assigned for temporary buffer storage purposes. After initiating the thresholding and steering of such data to/from the IMP, the ICD also communicates with the main CPU 403 at tasks 221 and 223 to inform it that these particular frames have been "taken" and stored in particular IPM planes while the main CPU, in turn, informs the ICD microprocessor as to which previously stored frames of thresholded data have now been processed by the image processing subsystem 300. These latter planes of the IPM are thus again made available for storage of future frames of video data.

In short, the ICD microprocessor is programmed so as to be informed (via the main CPU 403) as to which cameras are of interest. It also maintains a map of the available IMP space into which future frames of video data can be steered. All desired video frames are written to their respectively steered IMP planes in parallel if there is sufficient IPM space available for storage. Any leftover frames of camera data which are to be stored but which cannot presently be stored due to the unavailability of IPM space are identified and serviced at the next available time. The relative age of each such unserviced video frame is also maintained so that after some predetermined maximum time is elapsed, further injection of the CID camera in question is permitted (effectively losing that frame) and, of course, informing the main CPU 403 of this event by passing appropriate status information during the next communication with the main CPU. The ICD microprocessor also maintains an account of those frames of data still stored in the IPM but fully processed by the image processing subsection so that future frames of data to be captured may be steered to these now reusable memory locations. Furthermore, the ICD microprocessor is programmed so as to keep the main CPU 403 fully informed as to which frames of data have been effectively captured during the previous active video time.

A timing and mode control unit 202-11 is also provided in the IPM. It receives the system clock at approximately 4.5 mHz as well as mode control signals from the ICD. Conventional frequency dividers and logic gates are employed so as to provide reduced frequency read/write or read/modify/write phase I and phase II signals. These control signals are alternately "on" for approximately 440 nanosecond periods. During a phase I period, the IPM may be mode controlled either to output data to the corner point encoder or to permit the main CPU to read or write data either from or to the IPM via buffers 202-10 or 202-5. During phase II periods, incoming video frames are steered to available planes of the IPM while the IPM contents are simultaneously read to the video generator via registers 202-9. If there are no new video frames to be stored in the IPM during a phase II period, the contents of the IPM are nevertheless read to the video generator via buffer 202-9.

Using the exemplary form of corner point chain coding, there are four possible situations that may be encountered in finding "matched" corner points that are to be linked as part of a closed edge contour. These possibilities are shown explicitly in FIG. 6. For example, case one is a situation where the corner points are vertically aligned. This situation is indicated when the x coordinates of the corner points are equal, when the IN vector of one corner point is equal to the OUT vector of the other corner point and when these IN/OUT vectors are both vertically oriented. In case two, the differences between the x coordinates and y coordinates for the two corner points are equal, the out vector from one corner point equals the IN vector for the second corner point and these same OUT/IN vectors are aligned along a left diagonal. In case three, the differences between the x coordinates and the y coordinates for the two corner points are equal in magnitude but opposite in sign while the OUT vector of one corner point is equal to the IN vector of the second corner point and these same OUT/IN vectors are aligned along a right diagonal. In the fourth possibility illustrated at FIG. 6, the y coordinates of the corner points are equal, the OUT vector of one equals the IN vector of the other and these same OUT/IN vectors are aligned along a horizontal line. As should be appreciated, these same rules apply whether one is traversing an outside boundary in a counterclockwise fashion or an inside boundary in a clockwise fashion.

In the presently preferred exemplary embodiment, case four is a particularly simple case because of the left-to-right raster scanning process used to encode the corner points. In this instance, if two successive corner points are detected along any given horizontal line of the raster scan, if the OUT vector of the first corner point and the IN vector of the second corner point are equal and aligned horizontally, it is immediately known that these two corner points should be linked. Accordingly, corner point match decisions for case four in the exemplary embodiment can be made substantially immediately. However, decisions with respect to the other three possibilities cannot normally be made immediately in the exemplary embodiment. As will be explained in more detail below, special dedicated logic decision hardware is provided for identifying a match condition corresponding to any of these three remaining cases in a single micro-instruction cycle time. As should be appreciated, different embodiments of the invention may provide such dedicated decision logic hardware for all the possibilities or perhaps fewer possibilities if different raster scanning or other encoding techniques are employed. Furthermore, if more complex chain coding schemes are employed, there may be additional corner point match possibilities that must be taken into account.

The corner point encoder 301 is shown in more detail in FIG. 7. Serial thresholded video from the IPM is received here by a multiplexer 301-1 (typically 74LS251) which selects one of the eight IPM planes for video processing. Video polarity may be controlled at its output. The serial bit stream from 301-1 goes to the first row line buffer 301-2. The serial bit stream includes the 65,536 bits of a 256×256 bit video frame starting at the upper left-hand corner of the frame and proceeding in a raster-like fashion from left-to-right, top-to-bottom as previously described. The selection of a particular IPM plane for processing is done by the multiplexer 301-1 under control of the contents of the control register 301-3 which is filled by CPU 403 via the common bus system 500 and the usual address decoder 301-4 which produces various control signals used within the corner point encoder to control the loading of the control register 301-3, the initiation of a new cycle of operation for a new frame of data, etc.

The line buffers 301-2, 301-5, and 301-6 each comprise three serially-connected D-type flip-flops. Connected serially between the first and second line buffers is an additional 253 pixel buffer line delay 301-7 (typically realized by a type 2125 RAM). Similarly, serially-connected between the second and third line buffers is another 253 pixel buffer line delay 301-8. It should now be appreciated that as the bit serial stream representing each frame of video data is serially passed through this chain of buffer storage, the contents of the 3×3 pixel array defined by line buffer 301-2, 301-5, and 301-6 corresponds exactly to the raster scanning of a conceptual 3×3 encoder mask 124 over the entire 256×256 frame of video data as described in FIG. 2. Accordingly, on any given cycle of operation, the 9-bit content of this 3×3 encoding mask is presented to a PROM look-up table and valid corner detector 301-9 (typically a type 82S181). As previously explained, there are only 512 possible contents of such a 3×3 encoding mask and the PROM look-up table is set up so as to produce an output in response to any particular one of those 512 possibilities which represents whether it is a valid corner point and, if so, whether it is an A or B-type corner point, the identity of its IN vector and of its OUT vector and possibly corner codes indicating whether a double corner point or the like is involved and, if so, what type of double corner point.

To keep track of the x,y coordinates for any detected corner point, x and y address counters 301-10 and 301-11 are provided. Whenever a new frame of data is to be encoded, the main CPU triggers a "start" signal which initializes the x and y address counters. In the simplest case where the entire frame is to be encoded, both address counters may start at 0 with the x address counter incrementing up to a count of 256 before being reset to start over again at which time the y address counter is incremented. When the contents of both counters equals 256, the entire frame will have been analyzed and a "stop" signal or the like may be generated to signal the end of a complete encoding cycle. In this manner, the x and y address counters are continually updated (at the pixel bit rate on the serial input to the line buffers) so as to always instantaneously represent the x, y coordinates of the center of a 3×3 pixel encoding mask. If desired, a window control circuit 301-12 may also be provided so as to effectively limit the encoding process to a portion of the video frame. If so, addressable registers within this circuit would be filled by the main CPU 403 with data representing the beginning and ending x and y coordinates of the window together with suitable logic circuits for inhibiting the encoding process unless the contents of the x and y address counters is within the defined window, etc. Such window controls are believed to be conventional and are not critical to the practice of the claimed invention. Accordingly, they are not described in further detail here.

Typically, the ICD 4.5 mHz system clock is used for clocking the address counters and line buffers, etc., of the corner point encoder so as to maintain its operation in synchronism with the data stream being read from the IPM under control of the same ICD timing circuits. Depending upon how the x and y address counters are initialized, it may be necessary to insert some delay 301-13 between the output of the x and y address counters and the circuitry which is employed for computing and recording the actual x and y coordinates of the corner points to be encoded. Once proper synchronism is achieved (possibly by including such delay), the x, y address counter contents are presented to parallel adders (typically LS283) at 301-14 to compute the actual coordinates of the corner point (then being detected) to be recorded in the FIFO memory 302. As may be seen in FIGS. 2 and 5, an A-type corner point in the exemplary embodiment falls halfway between the vertical edges of a pixel while a B-type corner point falls halfway between the horizontal edges of a pixel. Accordingly, in this particular embodiment, to obtain an accurate digital representation of the actual x,y coordinates, the contents of the x and y address counters are doubled and added to another digital signal provided by the PROM 301-9 indicating whether an A or B-type of corner has been detected. A further constant term (e.g., three in the exemplary embodiment) may also be required to ensure that the calculated x,y coordinates actually represent the proper coordinates with respect to the center pixel of the 3×3 pixel encoding mask.

The output from the PROM 301-9 and from the parallel adders 301-14 now contains all of the data required for encoding a corner point as illustrated in FIG. 5. Such data is passed through a data formatting multiplexer (typically a type 74LS157) 301-15 before being recorded in the FIFO memory 302. Actual writing to the FIFO memory 302 is done only when a valid corner point is detected by an output from the PROM 301-9 as indicated in FIG. 7. As also indicated, actual writes to the FIFO memory 302 may be inhibited unless the x,y address counters are within a defined window. The data formatting multiplexer 301-15 is provided so that a special "start" word and a special "stop" word may be also written at the beginning and ending of the list of encoded corner points for a given frame if the FIFO memory 302. By inserting such start and stop words in the FIFO memory, the feature extractor/sorter 303 can itself determine when it has come to the end of a list of encoded corner points for a given frame. Typically, the start and/or stop words will include data identifying the camera and/or frame from which the encoded corner points were derived. In this way, once final decisions are made as to whether the frame represents an acceptable part, for example, further properly timed control signals may be generated by the main CPU 403 to actuate a reject mechanism or the like at a predetermined point downstream of the inspection station on the conveyor belt.

The hardwired dedicated decision logic of the CPE shown in FIG. 7 is connected so as to perform the tasks represented in the flow charts of FIGS. 8–10. When initiated with a CPEHW signal from the main CPU 403, the CPE begins the scanning process at 302-16—typically beginning at a desired "window" coordinate address. The line buffers are filled with thresholded data at 301-17 so as to define the contents of the 3×3 pixel encoding mask at that location and a PROM look-up cycle is performed at 301-18 to see if a valid corner point has been detected at decision point 301-19. If not, the line buffers and address counters are incremented at 301-20 and a test is made to detect the last pixel at 301-21. If the last pixel has not yet been reached, then another pixel of data is serially passed into and along the line buffer and another PROM look-up cycle is performed to test for the presence of a valid corner point. Whenever a valid corner point is detected, the current x,y coordinates, the IN, OUT vectors and the appropriate corner code are formatted at 301-22. If the FIFO memory is temporarily full, a wait loop is entered at 301-23 until, at the next available opportunity, the encoded corner point is written to the FIFO memory at 301-24. The encoding process is then continued by incrementing the line buffers at 301-20, etc.

Before the encoding process of FIG. 8 is initiated by the main CPU issuing the CPEHW start signal, the main CPU first issues a CPE TASK signal to initiate the CPE in accordance with the flow chart of FIG. 9. Here, at 301-25, the main CPU loads the CPE addressable registers which define the beginning and ending of a desired window and at 301-26, another addressable (frame) register is loaded with the identity of the frame to be encoded and/or of the IPM plane in which that frame is presently resident. This permits an appropriate "start" word to be written to the FIFO.

When a given encoding process has ended, the CPE generates a CPE interrupt signal to the main CPU and, at 301-27, writes status data to the main CPU which informs it that a complete frame has now been encoded and that this particular frame in the IPM may now be reused. At approximately the same time, an appropriate "stop" word is written to the FIFO memory as should now be apparent.

The feature extractor sorter 303 is shown in more detail at FIGS. 11, 14 and 15. The overall architecture is shown in FIG. 11 and is, for the most part, a conventional parallel bit slice processor architecture. It is divided into three units: the feature arithmetic unit (FAU) 303-1, the feature extractor memory (FEM) 303-2, and the feature instruction unit (FIU) 303-3. The usual communication capabilities are provided with the main CPU 403 via common bus conductor system 500. For example, I/O registers 303-4 are provided for holding status data, address bus output and data bus output signals for access by the main CPU 403. Other registers such as a data bus input register may also be included so as to permit the main CPU 403 to write control instructions and the like to the FES.

The heart of the FAU 303-1 is a 32-bit/slice microprocessor 303-5. In the exemplary embodiment, this 32-bit/slice microprocessor is formed by the interconnection of eight 4-bit/slice AM 2901 processors. In the preferred exemplary embodiment, these processors are interconnected as shown in FIG. 15 so as to permit interruption of the arithmetic "carry" signals between two 16-bit half-words during arithmetic computations for purposes that will be explained below in connection with the special corner point match logic 303-6 shown in more detail at FIG. 14.

It should be noted that the feature extractor/sorter is independently run with its own 5 MHz clock 303-7. The interrupt vector register 303-8, the literal or temporary data storage register 303-9, the pipeline instruction register 303-10, the microprogram memory 303-11 and the address sequencer 303-12 are all conventionally connected so as to provide the usual data and instruction transfer paths to implement a complete 32-bit/slice data processing system.

In the exemplary embodiment, virtually all of the required control signals for the FAU, FIU and FEM are derived from the pipeline instruction register as indicated in FIG. 11. The FAU 303-1 is also connected to receive 32-bit parallel words from the FIFO memory 302.

Multiplication capability is available in the bit/slice data processor of the FAU by virtue of a conventional multiplier 303-13. However, in the exemplary embodiment, the multiplier is a 16×16 multiplier integrated into the bit/slice configuration in a unique way. In particular, the 2901 bit/processor sources the operands, processes them in the arithmetic logic unit (ALU) and writes the results from the ALU to a designated destination all in one micro-instruction cycle. Accordingly, to take maximum advantage of this feature, the multiply input registers should have a programmable destination and the multiplier accumulating register should be programmably sourced. However, due to a limited number of pins on the multiplier circuit, the inputs and outputs are pin-shared for the least significant half of the resulting product and the y input. Such pin-sharing would seem to rule out the desirable configuration just described, however, it has been discovered that a split cycle arrangement may be provided as shown in FIG. 11 such that the y input is first loaded into a temporary multiply input register 303-14 when it is sourced. It is later transferred to the multiplier during the first quarter of the actual multiply cycle. It has been found that this operation is possible when the microcycle time is on the order of 200 nanoseconds. By providing the additional multiply input register 303-14, it is possible to achieve the desired programmably sourced and destined multiply operations using a single microinstruction cycle time rather than using two such cycle times. This is especially advantageous where multiply operations are used frequently. Latch 303-15 is also provided in the FAU to permit both the sourcing of FEM memory 303-21 and the destining of its ALU'd valve back to the same FEM memory location all within a single microcycle.

The feature start register 303-16 is addressed and filled by the main CPU when it is desired to cause the FAU 303-1 to jump to a particular subroutine in its microprogram memory. After possible modification by counting circuit 303-17 and selection by multiplexer 303-18, the appropriate first instruction of the desired subroutine is withdrawn from feature instruction memory 303-19 and passed via tri-state buffers 303-20 to the address sequencer 303-12 of the FAU. This is believed to be a conventional arrangement for permitting, in effect, the main CPU to vector interrupt the FAU microprocessor.

The corner memory 303-21 in the FEM is used during the ongoing sorting process to accumulate corner point chains, SLB chains and SLD's. Once the entire lists of encoded corner points for a given frame have been processed by the FES, the accumulated sorted lists of data are then read through the I/O registers 303-4 and the common bus conductor system 500 to the main CPU subsystem where they are stored in RAM memory for convenient access by user-generated decision logic programs.

As has already been mentioned (and as will be explained in more detail below), the corner point match logic circuit 303-6 is capable of determining whether a corner point match condition exists in a single micro-instruction cycle time. To take full advantage of this capability, the free end corner points already stored into linked lists within the corner memory (SLB chain) 303-21 must be successively presented one after another in successive micro-instruction cycle times as well so that the corner point match logic circuit 303-6 is timely supplied with the data required to make its corner point match decisions. To permit these successive rapid data transfers, an additional multiplexer 303-22 is connected between the output of the corner memory 303-21 and the address counter/register 303-23 whose contents determine the next word to be read out of the corner memory. Including multiplexer 303-24 in this feedback circuit also permits other inputs to the address counter/register 303-23 in accordance with more conventional arrangements.

A data swap multiplexer 303-25 permits the upper and lower halves of data words, for example, to be swapped one for another and transferred from the FEM to the FAU or FIU or, if desired, back through the multiplexer 303-24 to the address register 303-23 of the FEM itself. This provides still further degrees of flexibility that can often be used for saving time. This is especially true, for example, in processing doubly linked sorted lists of data where, typically, one word associated with each data word may have an upper half-word containing the address of the previous data word linked thereto while the lower half-word contains the address of the next subsequent data word linked thereto. In this circumstance, forward progression through the doubly linked lists could be made by passing the lower half of the link word to the address counter while reverse progression through the doubly linked lists could be had by transferring the upper half-word to the address register. The provision of a data swap multiplexer 303-25 permits this type of direction reversal in the linked list processing sequence to be effected immediately if desired.

Thus a variable jump address capability has been provided in the data memory portion of a microprogrammed machine. This capability is programmable within the microinstruction of the feature extractor/sorter and is a completely independent field from the jump capability of the microinstruction memory. Both jump capabilities may be used independently or concurrently. The programmed capability of the data memory address is such that the address may be:

(1) loaded from the 2901 output;
(2) incremented;
(3) jump immediate as function of left half of data word;
(4) jump immediate as function of right half of data word;
(5) indexed jump (0-63) as function of left half of data word; and
(6) indexed jump (0-63) as function of right half of data word.

Conventional PROM math function look-up table 303-26 is provided, if desired, for quickly looking up math functions such as sines, logarithms, etc.

The processing performance goal for the overall system is to process simple scenes at a rate of 900 parts/minute (67 millisec/part). The 67 millisec must be shared by relatively slowly executed user-generated application programs and the feature extraction/sorter processing which can therefore only have the smaller portion of this time. The feature extractor/sorter is in general able to do both connectivity (the connecting of the corners to form boundary outlines) and basic feature calculations such as area, perimeter, centroid and enclosing box coordinates of each item, whether a hole or a solid, within the scene in about 20-30 ms. If the simple scene contains up to 10 items (or blobs) and 100 corner points per item, both connectivity and feature calculations must be done in 20 microsec on each corner point. A reasoable subdivision of this would be to allow half the time for calculation of the features. Therefore, 10 microsec maximum is the time allowed for connectivity per corner point. Most of that time will be dedicated to updating the various linked lists, so 2 microsec is allowed to find the match. If there are 10 boundaries in the scene which are in the process of being formed, up to 10 comparisons must be made between the corner point being processed and one end of each partial boundary. This establishes a requirement of one comparison/200 nanosec.

The following is a set of basic desired parameters for the feature extractor/sorter: programmable, 5 MHz operation, dedicated multiply capability and connectivity match determination in a single operation. Further, moment of inertia calculations are desired in order to compute features such as principle axis and centroid. This requires a (pixel address)$^3$ operation which yields 27 bit significance. Since these features are being computed on an incremental basis (as each corner point is received) in order to minimize processing time, even further significance must be carried to avoid error when updating the accumulation after each incremental calculation. Thus, 32 bits is preferred as the processor computational size. The processor, therefore, must be a custom, micro programmable, 5 MHz, machine. One CPU choice for this requirement is eight AMD four bit slices accompanied by the TRW 1010 sixteen×sixteen multiplier.

The firmware controlled 2901's are configured to compute $\Delta x$ and $\Delta y$ simultaneously by interrupting the carry flow between the 4 bit slices. The remaining comparisons are done simultaneously by dedicated match logic. The preceding configuration takes care of the arithmetic requirement in order to perform the connectivity match determination in a single micro cycle. An addressing requirement exists in that the corner points at the ends of each unclosed item (partial boundary) must be accessed from corner memory indirectly i.e., specified as part of the previous fetch from corner memory. Thus, no time is expended in corner memory address determination. The potential match corner points are brought into the 2901 structure sequentially every 200 ns. from corner memory to be compared with the corner point being processed.

Considerable interface exists between the various boards of the system over the Intel Multibus TM. This is especially true between the feature extractor/sorter and the main CPU. All of the above interface is memory mapped which yields virtually limitless capability considering the 20 bit address space of the 8086. Preferably the micro program memory is RAM and it is both memory mapped writable and readable over the Multibus. Additionally, it is desired to have the feature extractor/sorter have the capability of functioning as a Multibus master so that when the feature computations are complete, it can take over the Multibus and transfer these results to system control memory in a block transfer. Then the main CPU has all feature data required to proceed with the analysis task while the feature extractor/sorter can proceed with the next assigned task. In order for the feature extractor/sorter to act as a bus master, it is not necessary for it to contain an Intel bus arbiter circuit. The requirement is that the feature extractor/sorter have access to the "Bus Priority In" line of the 86/12A.

To facilitate processing, it is desired to be able to take a literal value directly off the micro-instruction which can be used to Index, Mask, etc. This is the function of the Literal Register. A latch between the corner memory output and the 2901 external port allows a read from the FEM, and ALU execution and the resultant written back to the same FEM address, all within the same micro cycle. The data swap MUX in conjunction with the latch permits a single instruction half word exchange of a word resident in the FEM.

The micro sequencer of this processor has the normal jump condition address sources of pipeline register, interrupt vector register and feature instruction memory (FIM). The interrupt vector address may be loaded from the 2901 output, and the lower 6 bits may be loaded by the corner code portion of the corner point encoder word transferred to the feature extractor. The FIM permits macro capability when the start address of various feature calculation tasks have been memory mapped written into consecutive locations of the FIM by the system controller. At the completion of each task the feature counter addressing the FIM is incremented to the next task via micro program control.

Other desirable features of the processor are run, halt, step control capability via the Multibus, full 32 bit diagnostic monitoring of the FAU output, controllable micro program starts and breakpoint trap capability. Bi-directional interrupt communications are utilized between system controller and the feature extractor. The interrupts to the 8086 go into its normal priority interrupt structure while interrupts to the feature extractor are processed on a polled basis.

The feature extractor/sorter is microcoded to accomplish image analysis in the fastest possible time. The corner point sorting firmware occupies about two-thirds of the system's 1K×48 writable control store (WCS). The custom designed dedicated corner point match hardware is used to speed up the corner point sorting routine by quickly finding a "match" between a corner point and a partially formed item chain. The routine can service a corner point every 23 microseconds, taking 13 microseconds to sort and link the corner point, and 10 microseconds to compute the atomic features. At that rate, a 1400 corner point scene, for example, can be analyzed in real time.

When other "extended" features are calculated, the corresponding firmware is stripped into the WCS not used by the corner point sorter firmware. Since the sorting routine is large and frequently used, it remains resident in the WCS. Most extended feature calculations average 3.6 microseconds/corner point so that an extended feature takes 360 microseconds for a 100 corner point item, not including the strip time. The 8086 takes 2 ms to strip a 200 micro-instruction routine into the WCS.

The processor has an 8K×32 RAM corner memory for data and variable storage. 80% of the memory is devoted to corner point storage, with a maximum of 3328 corner points available in a given picture. 12% of the memory is used to hold the partial atomic feature calculations for each item as the picture model is being built. Presently, a total of 100 items are allowed in a given picture. The rest of the memory holds variables and data necessary for the proper sorting of corner points into their respective item boundaries.

The 48 bit control word for the bit slice processor is preferably designed to allow 4 types of microinstructions as determined by bits 0 and 1. The first type is a normal ALU instruction, where internal and/or external data is selected for input into the ALU. The ALU field selects the ALU operation desired and the ALU output is placed in either an internal ALU register or an external destination (e.g., memory). The second instruction type is like the first except it allows the modification of the feature extractor memory address (FEMA). The third type of instruction performs an ALU NO-OP, but allows the loading of the 32 bit literal register with a constant contained in the microinstruction. This type of instruction also allows special functions to be performed, like a Multibus read or write function. The fourth instruction type allows the microprogram to jump to the address specified in the microinstruction and also performs an ALU NO-OP. The four instruction types allow jump and literal capability without extending the microword beyond 48 bits.

In summary, the architecture of the parallel bit slice/data processing system shown in FIG. 11 is believed to be of substantially conventional design with the following exceptions:

(a) the unique dedicated corner point match logic circuits 303-6 shown in detail in FIG. 14 and the related special organization of the 32-bit/slice microprocessor 303-5 shown in greater detail at FIG. 15;

(b) the provision of a multiply input register 303-14 so as to permit desired multiply I/O operations to be performed in a single micro-instruction cycle;

(c) the provision of a feedback circuit from the output of the corner memory 303-21 to its address register 303-23 which feedback circuit may possibly include a multiplexer such as 303-22; and (d) the provision of the data swap multiplexer 303-25.

The doubly linked data content of the corner memory 303-21 is shown during the sorting process at FIG. 12 and after the sorting process at FIG. 13. Starting at the lowest level of the linked organization, the x,y coordinates of already-linked corner point chains (but still not completely closed) are depicted at 600–605. Each such corner point is represented by two 32-bit words. The first 32-bit word includes the x and y coordinates of the corner point while the second immediately succeeding 32-bit word includes the relative address of the previous corner point and the address of the next corner point in the linked chain. The arrows in FIG. 12 diagrammatically depict such linkages. As shown, there are two partially completed chains of linked corner points. Since the corner points are not yet completely linked to represent a closed edge contour, there are two free end corner points in each such chain. For example, in the first chain in FIG. 12, there is free end corner point at 600 and a free end corner point at 602 while in the second chain there is a free end corner point at 603 and at 605. Linked addresses to these free end corner points are maintained in associated sorted blob descriptor (SBD) files with one SBD file being maintained for each corner point chain either partially completed or closed, as shown in FIG. 12. As earlier explained, each SBD also includes the current accumulation of incrementally calculated geometric features for the blob associated therewith.

A linked chain of SLB files is also maintained, one SLB being provided with each partially formed corner point chain, as also shown in FIG. 12. The SLB contains all the information specifying the open ends of the blob, i.e., the in and out vectors and the x,y coordinates. One word of the SLB is headed to determine whether an unsorted corner belongs to that blob, such determination being made by the corner point match logic.

As soon as the linked corner chains are closed (by finding a corner point that links to both of the free end points), its corresponding SLB is freed for use in initiating another SBD and an associated partially closed new corner chain. The completed SBD and associated closed doubly-linked corner point list is stored as shown in FIG. 13 for eventual transfer to the main CPU 403.

In earlier explaining the different possible match conditions, it will be noted that it is necessary to compute the difference between x and y coordinates for the corner points being tested. The 32-bit/slice processor is preferably connected as shown in FIG. 15 so as to permit this calculation to be made simultaneously for both x and y coordinates in one micro-instruction cycle time. Typically, eight 4-bit/AM 2901 processors are connected with look ahead and carry chips (AM 2902) so as to perform 32-bit arithmetic in parallel in one microinstruction cycle time. However, by using an OR gate 700, the ALU of the AM 2901 may be caused to simultaneously perform dual 16-bit arithmetic instead of 32-bit parallel arithmetic. Selection between these two modes of operation may be program controlled by a signal such as CFLOWENL shown in FIG. 15 as one input to NOR gate 700. In the presently preferred embodiment, this signal may be generated by one stage of the pipeline instruction register included in the 2901 microprocessor system as earlier discussed. In effect, the gate 700 permits interruption of the normally propagated carry signals between the lower and upper 16-bit halves of the 32-bit/slice ALU. When this carry path is thus interrupted, the upper and lower 16-bit halves of the ALU perform arithmetic independently of each other.

It will be recalled that the corner point encoder produces encoded corner points in the 32 bit word format shown in FIG. 5. In the preferred exemplary embodiment, the corner code data as well as the OUT and IN vector data is initially stripped by the FES from each CPE word to be compared for match conditions. The OUT and IN vector data is separately stored in register 702 (FIG. 14) so that it may be accessible for decision logic purposes at a later time while the corner code data may have already been used to generate an additional CPE word—for example if a double corner point is involved. When the corner code and vector data fields of the 32-bit word shown in FIG. 5 are thus stripped (i.e., set to 0), the only thing that remains is the pixel x address in the first 16 bits and pixel y address in the second 16 bits. The vectors for the free end points of the already partially linked chain for which a match is being attempted are retrieved from the SLB and presented to the dedicated logic on six parallel bit lines at 704 in FIG. 14. A single bit IN/OUT selection signal (e.g., from the pipeline register) is also presented at 706 depending upon whether a match is being attempted to the free IN vector of a partially linked chain of corner points or to the free OUT vector of that chain. The pixel x and y addresses for the newly-presented corner point and for the free end corner point to be tested for match are presented to the 2901 as it is conditioned to perform dual 16-bit arithmetic as previously discussed. Accordingly, within one miro-instruction cycle time, the difference $\Delta x$ between the x coordinates of the corner points involved and the difference $\Delta y$ between the y coordinates of the corner points involved will be simultaneously computed and presented as the 9-bit $\Delta x$, $\Delta y$ output signals shown in FIG. 15 and presented as inputs to the dedicated decision logic circuitry shown in FIG. 14.

The $\Delta x$, $\Delta y$ signals are presented to parallel bit adders 708 (typically type S283) and parallel bit subtractors 710 (typically type S86) to simultaneously compute the sum and difference, respectively, of the $\Delta x$, $\Delta y$ signals. The results of the summation at 708 and subtraction at 710 are logically combined in gates 712 and 714, respectively, to produce a single bit output indicating whether the sum and difference, respectively, are equal to zero. At the same time, gates 716 are wired to detect whether $\Delta x$ is equal to 0. As previously explained, because of the left-to-right raster scanning process employed in the exemplary embodiment, it is not necessary to test for $\Delta y$ being equal to 0.

Simultaneously, multiplexer 718 and multiplexer 720 have selected the appropriate 3-bit pairs representing the IN vector of the new corner point being tested and the OUT vector of a free end corner point in a partially linked chain or, alternatively, the OUT vector of the new corner point to be tested and the IN vector of the free end corner point in a partially linked chain. These selected IN/OUT or OUT/IN vector data are compared by gates 722 to detect whether they are equal. If so, they present a gate enabling signal to each of decision logic output gates 724, 726 and 728. Inverters 730, 732 and gates 734, 736 and 738 are connected as shown in FIG. 14 so as to detect whether the IN/OUT or OUT/IN vectors being compared align vertically, along a left diagonal or along a right diagonal, respectively. The output from gates 734–738 and 712–714 are logically combined together with the gate enabling signal previously discussed in decision logic output gates 724, 726 and 728 so as to identify the presence of any of the match possibilities corresponding to cases one, two or three as previously discussed with respect to FIG. 6. If any of these match possibilities are present, a "match" output is produced by OR gate 740 to indicate that the newly-presented corner point now under test is indeed matched to the free end corner point now being tested for match therewith. This hardware control output is then sensed by the image processing data processor to indicate that the linked chains should be properly updated so as to reflect this linkage. Of course, when one free end of a partially completed chain has been matched to a newly-presented corner point, a similar test must also be made to other free end of that and other chains to detect whether the newly-presented corner point is the final link in a chain or a bridge between two chains, etc. so as to finally describe a completely closed edge contour. It should be noted that all of the dedicated hardware decision logic shown in FIGS. 14 and 15 is capable of detecting whether a given corner point is matched to a given free end corner point of a previously linked set in but a single microinstruction cycle time.

An exemplary flow chart for a suitable microprogram to be stored in the microprogram memory 303-11 of the FES for achieving such corner point sorting is depicted in the flow charts of FIGS. 16-1 through 16-9. The overall executive program shown in FIG. 16-1 maintains a constant lookout for an interrupt from the main CPU at decision block 800. Whenever such an interrupt is detected, a jump is made to the microcode routine at 802 so as to execute the proper feature extractor tasks. When any of these tasks has been completed, the executive routine is again entered to await a further interrupt instruction from the main CPU.

The sorter task shown in FIG. 16-2 first initializes the corner memory at 804 by relinking all of the old SLB dummy records to ensure that they are ready for use in a sorting routine. When a wait loop is entered at 806 until the FIFO memory 302 is ready to furnish another encoded corner point word. The next encoded corner point word is then received from the FIFO memory at 808 and a jump is made to a service subroutine based upon the corner code at 810. If the corner code indicates that a double corner point is actually involved, a further encoded corner point record will be automatically created by the FES to represent the second corner point's x, y coordinates and IN/OUT vectors. Unless the double corner point is one where linkage is automatically implied, it will subsequently be treated just as though it were another encoded corner point read from the FIFO memory.

Typically, the corner point processing uses some combination of routines as shown in FIG. 16. If a match to a partially completed corner chain is necessary, either the "FIND IN MATCH" or the "FIND OUT MATCH" routine is called. The special corner point match logic circuitry is initialized and the existing SLB list is scanned in successive micro-instructions until a match indication is indicated. A record of the matched SLB address is retained before continuing the corner point processing.

For corner points which merge two corner chains or close a corner chain, a check is made to see whether the corner point matches both free ends of a corner chain. This indicates that the corner point under test closes the partially linked blob and transfer is made to a close blob subroutine as shown at FIG. 16-9. On the other hand, if two matches have been detected and they do not involve the same partially linked blob, then transfer is made to the proper merge routine as shown in FIG. 16-8 as this indicates that two partially closed linked chains are now to be linked together so as to form one partially linked chain.

A new blob is started as shown in FIG. 16-3 by creating a new SLB and linking it to the initial corner point of a new chain. At the same time, a new SBD is created and properly linked, initialized, etc. The corner point x,y coordinates are then stored in the proper doubly linked manner as previously described.

Figure 6:
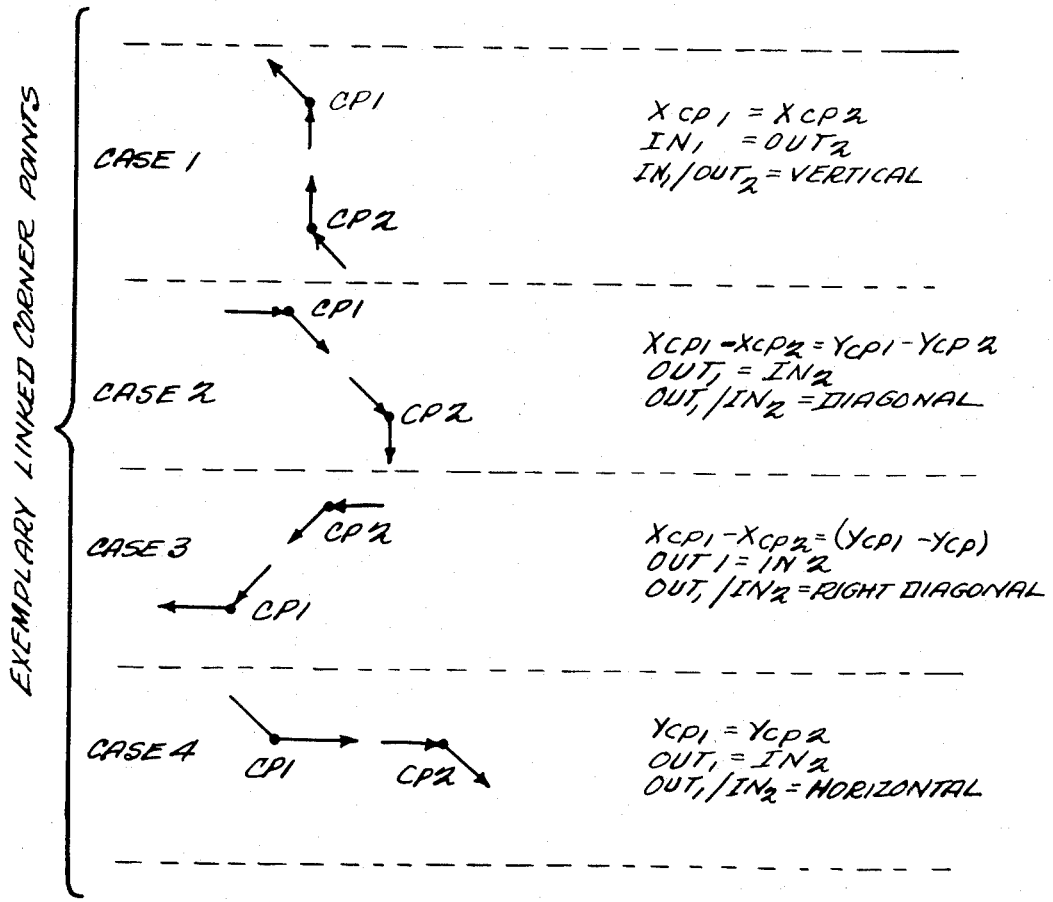
FIG. 6 is a diagram depicting four exemplary matched corner point possibilities useful in understanding the exemplary embodiment of this invention.

Connection on to the "IN" side of an existing partially completed blob is made with the subroutine of FIG. 16-6. Here, at 838, the proper SLB IN vector and coordinate data is updated. As previously indicated, because of the left-to-right raster scanning process involved in the encoding (and hence in the storage of successively encoded corner points in the FIFO memory), it is relatively easy to determine whether successive corner points on a given line are to be linked. If one of those conditions is detected, entry is made at 840 to the connection subroutine shown in FIG. 16-6. At 842, the linked pointers in the SBD are updated and at 844, the corner chain itself is updated as are the linkage addresses. At 846, the incremental or "atomic" geometric features are calculated using the new corner point and either the just previous corner point or the next corner point in the partially linked corner point chain, depending on whether the new corner point connects to the "OUT" side or the "IN" side of the chain. From these points, calculations can be made for the blob area, first moment, second moment and perimeter.

The connection subroutine for the "OUT" side of the partially completed blob as shown in FIG. 16-7 is similar to that for the "IN" side of the blob with the steps 848–856 corresponding respectively to the steps 838–846 except that linkages are made to the "OUT" free end corner of the partially completed blob rather than to the "IN" free end corner.

The merge routine shown in FIG. 16-8 merges the "OUT" side of one partially completed blob to the "IN" side of a second partially completed blob or vice versa. If the first case is at hand, then the new corner point is connected to the OUT side while if the converse is the case, the new point is connected to the IN side of the first blob at 860. In any event, only the first SLB is retained and the second SLB is freed for later use at 862 while the first SLB is updated so as to properly reflect the totality of the now merged and linked chain of corner points into a single chain. The actual corner point data is, of course, also address linked at 864 and new atomic feature calculations are also made. Finally, at 866, the first SBD is updated so as to include total data representing the combination of these two partially linked chains.

When a corner is found to be linked to both free ends of a given partially completed corner point chain, then the routine at FIG. 16-9 is entered and the SLB is removed from the active chain at 868 so as to free it for further use in subsequent sorting procedures. The corner point in question is then doubly linked to both free ends of the chain at 870 while the atomic feature calculations are finished at 872 and the SBD address is stored away at 874.

After a given encoded corner point word from the FIFO memory has thus been handled by one of the service subroutines, a test is made at 876 of the sorter task in FIG. 16-2 to see if the last CPE word coming from a given frame has yet been processed. If not, the entire chain of events just recounted is repeated as shown in FIG. 16-2. When the last CPE word of a given list corresponding to a given frame of video data has been thus processed, final atomic feature calculations are made at 878 so as to update the SBD to its final form for eventual transfer to the main CPU so that it may be conveniently accessed by the user-generated decision logic.

The overall system control including hardware/software and/or firmware interfaces is generally depicted at FIG. 17. As shown, and as previously explained, the raw video input is provided by cameras 110 to the CII 201. The gray-scaled images are thresholded and then temporarily stored in the IPM buffer 202 before being passed to the CPE 301. The CPE 301 further reduces a frame of thresholded video data to a list of encoded corner points which are thereafter stored in a FIFO memory 302. The feature extractor/sorter 303 then sorts the encoded corner points into ordered lists and calculates predetermined geometric features of the resulting closed linked lists (which describe closed edge contours in the image under test). The results of the feature extractor/sorter computations are then stored in the RAM memory 401 of the main CPU 403 in the system/decision processing subsystem 400. User-generated programs 410 are stored in the core memory or in the PROM 402, cassette tape recorder 407, etc. Typically, the user programs may be in a relatively high level language which requires a software-implemented interpreter 412 to create an executable user-generated software library 414. The user is thus permitted to instruct the ICD under software control at 416 to capture a frame of video data, to display a particular frame of the IPM on the image display 112, etc. Typically, the user will configure the system so as to be triggered by external hardware generated signals on line 106 as previously described.

Hardware interrupts 1, 2 and 3 are shown in FIG. 17 as dotted lines. For example, as soon as a new frame of video data has been captured in one of the cameras 110, a hardware interrupt is transmitted to the main CPU 403 which causes a jump in its program to an interrupt service routine (ISR) labeled ICD and shown in FIG. 18. Similarly, whenever the corner point encoder 301 is finished encoding a frame of video data, a hardware interrupt is transmitted to the main CPU for 403 to cause the entry of the CPE interrupt service routine shown in FIG. 19. Whenever the feature extractor/sorter 303 has finished processing a given frame of data, another hardware interrupt signal is generated and passed to the main CPU for 403 which causes entry to the FES interrupt service routine shown in FIG. 20. Memory mapped commands are generated by the main CPU 403 to generate start signals for the CPE 301 and the feature extractor/sorter 303 as well as to signal which IPM planes may be released for further reuse. The ICD itself generates the camera steering control and bit steering control signals to the CII 201 and IPM 202 as shown in FIG. 17. As also shown in FIG. 17, the user-generated software is informed when the feature extractor/sorter 303 has completed each frame of captured video data so that user-generated programs can then access that data within the RAM 403 and perform any desired decision logic thereon to generate accept-/reject control signals or the like.

The ICD interrupt service routine shown in FIG. 18 is actually entered every 33 milliseconds (once for each display frame on the monitor 112) but since a "picture" is not taken unless a hardware or software command is received to take a picture, a check is made at 900 of the ICD status at the time of the interrupt to see if any new pictures have been taken. If not, control is given back to the user-generated software under execution by the main CPU 403 until the next interrupt service routine occurs. However, if the status of the ICD indicates that a "picture" has been captured in the IPM memory, then the corner point encoder 301 will be signalled to begin scanning the proper IPM plane. It will, of course, continue to carry out its functions after once being started and to store the results in the FIFO memory. At 904, the feature extractor/sorter 303 is also signalled to start and it will do so based upon the contents of the FIFO memory 302 until an end of frame signal is sensed in that memory.

The CPE interrupt service routine shown in FIG. 19 causes the main CPU 403 to transmit data to the ICD indicating that the CPE has finished processing a particular plane of the IPM and that, accordingly, this particular plane of the IPM is now available for buffer storage of another frame of thresholded video data.

The FES interrupt service routine shown in FIG. 20 signals the user decision logic (UDL) that the feature extractor has finished processing a given frame of previously captured data and the location of the resulting SBD in the RAM memory 401 which is now available for access by the user-generated decision logic.

An exemplary user-generated program for the main CPU 403 is depicted in the flow chart of FIG. 21. At 950, the overall system is initialized by setting the desired threshold levels in the CII, the desired window in the CPE, etc. At 952, the ICD is instructed to capture a frame of data from a specific camera number or perhaps to do so when it receives an externally generated hardware signal indicating that a part to be inspected is within the field of view. A wait loop is then entered at 954 until that frame of video data has been captured and completely processed by the dedicated logic of the video processing and image processing subsystems. Then, at 956, a decision is made based upon the atomic feature data base (e.g, area, centroid, perimeter, etc.) already present in the SBD for that frame as to whether the part meets predetermined criteria. At 958, the feature extractor may be instructed to perform additional geometric calculations (such as the measurement between specified points, etc.) so that additional decision criteria will be available for processing. Another wait loop may be entered at 960 while the feature extractor performs these additional calculations. Once they become available, a final output decision is calculated by the user-generated decision logic at 962 before looping back to capture another frame of video data, for example. It should be appreciated, there will be a wide variety of user-generated decision logic that may be employed so as to use this system in a specific application.

It should now be appreciated that this invention provides method and apparatus for efficiently converting binary pictures into an easily analyzed region based representation by, among other things, employing:

1. A two-dimensional encoding scheme utilizing a 3×3 window which generates an output at and only at each "corner" in the picture. (A corner is a location where a region boundary changes direction.)

2. A sorting scheme which sorts the corners efficiently by region and places them in an ordered list representing the closed boundary of the regions.

3. Region boundary analysis schemes which can be used to efficiently compute measuration type feature values, shape descriptions, sizes, topological relationships, etc.

The various components of this method along with the hardware and software required to implement them provide an improved solution to the picture digestion and analysis problem which has a number of unique advantages:

1. The corner point encoding scheme encodes the picture based on the two-dimensional information content. Thus a higher level of data compression is achieved than with one dimensional schemes such as run-length encoding.

2. The encoder is based on passing a single 3 by 3 window once over the picture while Zahn (for example) required alternating passes of 2×2 and 3×2 windows. This permits a much simpler implementation and encodes the picture while it is being output by the camera in real time not requiring it to be stored in a frame buffer.

3. The 3 by 3 window encoder can also be utilized to quickly eliminate single pixel noise while encoding the picture.

4. The sorting scheme sorts the corner points as they come from the sorter into ordered lists by region. The sorter operates quickly requiring little searching; also the searching can be expedited by use of special hardware.

5. The sorting scheme accounts for the fact that corners come in from two rows simultaneously without buffering corners from the second row until the first has been sorted.

6. The resulting region boundary description is in an optimal format for analysis. The system automatically generates a boundary description based on vertices (corners). Since these vertices are represented as X and Y positions, properties and measurements can be directly computed. Other systems often generate intermediate format data which must be converted, or they lose the boundary description altogether.

7. This vertex based boundary description can be easily scaled, shifted, and rotated. In many other techniques, especially those which store pixels, this is almost impossible as a practical matter.

8. The region boundary descriptions can be further simplified by syntatically parsing them to remove extraneous corner points. By utilizing a high order syntatical parser which is aware of the unique features generated by the basic spatial quantization and encoding scheme, the boundary can be substantially simplified without distortion.

Although only one presently preferred exemplary embodiment of this invention has been described in detail in the foregoing specification, those skilled in the art of designing vision processing systems will recognize that many variations and modifications may be made in the exemplary embodiment while yet retaining many of the novel and advantageous features of its construction and/or operation. Accordingly, all such variations and modifications are intended to be included within the scope of the following appended claims.

What is claimed is:

1. A feature extractor sorter apparatus for use in a visual image processing system which automatically determines whether newly supplied corner point identifying digital data should be linked to a free end corner point identifying digital data of a given set of other already linked corner point identifying digital data, where each corner point is identified by x, y coordinates and IN and OUT vectors, so as to represent part of a closed edge contour, said apparatus comprising:

microprocessor means for providing $\Delta x$, $\Delta y$ digital data signals representing the difference $\Delta x$, $\Delta y$ between x, y coordinates of said newly supplied corner point identifying digital data and the x, y coordinates of said free end corner point identifying digital data of a given set of other already linked corner point identifying digital data;

summing means connected to receive said $\Delta x$, $\Delta y$ digital data signals and to compute the sum $\Delta x + \Delta y$ of said $\Delta x$, $\Delta y$ digital data signals and to produce a corresponding $\Delta x + \Delta y$ digital signal;

difference means connected to receive said $\Delta x$, $\Delta y$ digital data signals and to compute the difference $\Delta x - \Delta y$ of said $\Delta x$, $\Delta y$ digital data signals and to produce a corresponding $\Delta x - \Delta y$ digital signal;

memory means for storing vector data representing the IN/OUT vectors of said newly supplied corner point identifying digital data and the unconnected OUT/IN vectors of said free end corner point identifying digital data of said given set of other already linked corner point identifying digital data;

vector comparison means connected to said second register means for comparing said IN/OUT and OUT/IN vector data and for producing a gate enabling signal when there is a match between the IN vector data of the newly supplied corner point and the OUT vector data of the free end corner point identifying digital data and when there is a match between the OUT vector data of the newly supplied corner point identifying digital data and the IN vector data of the free end corner point identifying digital data;

vector orientation detection means connected to receive at least some of said vector data and to produce (a) a vertical vector signal if the IN/OUT (OUT/IN) vector data of either said free end corner point identifying digital data or said newly supplied corner point identifying digital data is vertical, (b) a first diagonal vector signal if the IN/OUT (OUT/IN) vector data of either said free end corner point identifying digital data or said newly supplied corner point identifying digital data is along a first predetermined diagonal, and (c) a second diagonal vector signal if the IN/OUT (OUT/IN) vector data of either said free end corner point identifying digital data or said newly supplied corner point identifying digital data is along a second predetermined diagonal; and logic gate means connected to receive said $\Delta x + \Delta y$, $\Delta x$, $\Delta x - \Delta y$, gate enabling, vertical vector, first diagonal vector and second diagonal vector signals and to produce an identifying control signal output if said gate enabling signal is present and at least any one of the following conditions is also met:

(a) $\Delta x + \Delta y = 0$ and said second diagonal vector signal is present, (b) $\Delta x = 0$ and said vertical vector signal is present, or (c) $\Delta x - \Delta y = 0$ and said first diagonal vector signal is present.

2. A feature extractor sorter apparatus as in claim 1 wherein:

said microprocessor means comprises two N bit arithmetic logic units (ALU's) each having carry flow input and output signal terminals with a control gate connected in a carry signal circuit between a first of the N bit ALU's and a second of the N bit ALU's such that said $\Delta x$, $\Delta y$ digital data signals are simultaneously provided by said first and second N bit ALU's respectively when said control gate is disabled from passing carry signals.

3. A feature extraction sorter apparatus as in claim 1 or 2 wherein:

said summing means comprises an N bit parallel adder capable of producing said $\Delta x + \Delta y$ digital signal substantially immediately after being presented with said $\Delta x$, $\Delta y$ digital data signals; and said difference means comprises an N bit parallel subtractor capable of producing said $\Delta x - \Delta y$ digital signal substantially immediately after being presented with said $\Delta x$, $\Delta y$ digital data signals.

4. A feature extractor sorter apparatus as in claim 1 wherein said vector comparison means includes multiplex means connected to said second register means for selectively providing 2M stored bits of vector data representing one of the following pairs of vectors:

(a) the IN vector of the newly supplied corner point and the OUT vector of a free end corner point; and (b) the OUT vector of the newly supplied corner point and the IN vector of a free end corner point.

5. A feature extractor sorter apparatus as in claim 4 wherein said vector comparison means includes a 2M bit parallel comparison circuit capable of making M simultaneous comparisons of bit pairs and of producing said gate enabling signal substantially immediately after being supplied with 2M bits of vector data by said multiplex means.

6. A feature extractor sorter apparatus as in claim 5 wherein said vector orientation detection means includes bit comparison gates connected to compare predetermined logical combinations of said 2M bits of vector data provided by said multiplex means.

7. A feature extractor sorter apparatus as in claim 3 wherein said vector comparison means includes multiplex means connected to said second register means for selectively providing 2M stored bits of vector data representing one of the following pairs of vectors:

(a) the IN vector of the newly supplied corner point and the OUT vector of a free end corner point; and (b) the OUT vector of the newly supplied corner point and the IN vector of a free end corner point.

8. A feature extractor sorter apparatus as in claim 7 wherein said vector comparison means includes a 2M bit parallel comparison circuit capable of making M simultaneous comparisons of bit pairs and of producing said gate enabling signal substantially immediately after being supplied with 2M bits of vector data by said multiplex means.

9. A feature extractor sorter apparatus as in claim 8 wherein said vector orientation detection means includes bit comparison gates connected to compare predetermined logical combinations of said 2M bits of vector data provided by said multiplex means.

10. A feature extractor sorter apparatus as in claim 1 or 2 further comprising a programmed microprocessor and associated RAM memory capable of executing an instruction in a predetermined instruction cycle time and connected to control said register, summing, difference, second register, vector comparison, vector orientation detection and logic gate means so as to be capable of producing successively said identifying control signal outputs during respectively corresponding successive instruction cycle times such that another identifying control signal output, indicating whether a newly supplied corner point is to be linked to an existing already linked set of corner point identifying data, is produced concurrently as successive data representing the existing free end corner points of such linked sets is recalled from said RAM memory.

11. A feature extractor sorter method for use in a visual image processing system which automatically determines whether newly supplied corner point identifying digital data should be linked to a free end corner point identifying digital data of a given set of other already linked corner point identifying digital data, where each corner point is identified by x, y coordinates and IN and OUT vectors, so as to represent part of a closed edge contour, said method comprising:

providing $\Delta x$, $\Delta y$ digital data signals representing the difference $\Delta x$, $\Delta y$ between x, y coordinates of said newly supplied corner point identifying digital data and the x, y coordinates of said free end corner point identifying digital data of a given set of other already linked corner point identifying digital data;

electronically computing the sum $\Delta x + \Delta y$ of said $\Delta x$, $\Delta y$ digital data signals and producing a corresponding $\Delta x + \Delta y$ digital signal;

electronically computing the difference $\Delta x - \Delta y$ of said $\Delta x$, $\Delta y$ digital data signals and producing a corresponding $\Delta x - \Delta y$ digital signal;

storing vector data representing the IN/OUT vectors of said newly supplied corner point identifying digital data and the unconnected OUT/IN vectors of the free end corner point identifying digital data of said given set of other already linked corner point identifying digital data;

comparing said IN/OUT and OUT/IN vector data and producing a gate enabling signal when there is a match between the OUT vector of the newly supplied corner point and the OUT vector of the newly supplied corner point and the IN vector of the free end corner point;

producing (a) a vertical vector signal if the IN/OUT (OUT/IN) vector data of either said free end corner point identifying digital data or said newly supplied corner point identifying digital data is vertical, (b) a first diagonal vector signal if the IN/OUT (OUT/IN) vector data of either said free end corner point identifying digital data or said newly supplied corner point identifying digital data is along a first predetermined diagonal, and (c) a second diagonal vector signal if the IN/OUT (OUT/IN) vector data of either said free end corner point identifying digital data or said newly supplied corner point identifying digital data is along a second predetermined diagonal, and producing an identifying control signal output if said gate enabling signal is present and at least any one of the following conditions is also met:

(a) $\Delta x + \Delta y = 0$ and said second diagonal vector signal is present, (b) $\Delta x = 0$ and said vertical vector signal is present, or, (c) $\Delta x - \Delta y = 0$ and said first diagonal vector signal is present.

12. A feature extractor sorter method as in claim 11 wherein:

said providing step comprises interruption of a carry signal circuit between a first N bit stage of an 2N bit arithmetic logic unit (ALU) of a 2n bit slice microprocessor and a second N bit stage of said ALU such that said $\Delta x$, $\Delta y$ digital data signals are simultaneously provided by said first and second N bit stages of the ALU respectively when interruption occurs.

13. A feature extractor sorter method as in claim 11 or 12 wherein:

said first computing step comprises use of an N bit parallel adder capable of producing said $\Delta x + \Delta y$ digital signal substantially immediately after being presented with said $\Delta x$, $\Delta y$ digital data signals; and said second computing step comprises use of an N bit parallel subtractor capable of producing said $\Delta x - \Delta y$ digital signal substantially immediately after being presented with said $\Delta x$, $\Delta y$ digital data signals.

14. A feature extractor sorter method as in claim 11 wherein said comparing step includes selectively providing 2M stored bits of vector data representing one of the following pairs of vectors:

(a) the IN vector of the newly supplied corner point and the OUT vector of a free end corner point; and (b) the OUT vector of the newly supplied corner point and the IN vector of a free end corner point.

15. A feature extractor sorter method as in claim 14 wherein said comparing step includes making M simultaneous comparisons of bit pairs and of producing said gate enabling signal substantially immediately after being provided with said 2M bits of vector data.

16. A feature extractor sorter method as in claim 15 wherein said first-mentioned producing step includes comparing predetermined logical combinations of said provided 2M bits of vector data.

17. A feature extractor sorter method as in claim 13 wherein said comparing step includes selectively providing 2M stored bits of vector data representing one of the following pairs of vectors:

(a) the IN vector of the newly supplied corner point and the OUT vector of a free end corner point; and (b) the OUT vector of the newly supplied corner point and the IN vector of a free end corner point.

18. A feature extractor sorter method as in claim 17 wherein said comparing step includes making M simultaneous comparisons of bit pairs and of producing said gate enabling signal substantially immediately after being supplied with said 2M bits of vector data.

19. A feature extractor sorter method as in claim 18 wherein said first-mentioned producing step includes comparing predetermined logical combinations of said 2M bits of vector data.

20. A feature extractor sorter method as in claim 11 or 12 further comprising the use of a programmed microprocessor and associated RAM memory capable of executing an instruction in a predetermined instruction cycle time and wherein said identifying control signal output is produced during a single instruction cycle time when data representing an existing free end corner point of an existing already linked set of corner point identifying data and data representing a newly supplied corner point are made available for processing.

* * * * *